US012374240B2

(12) United States Patent
Tsai et al.

(10) Patent No.: US 12,374,240 B2
(45) Date of Patent: Jul. 29, 2025

(54) DISPLAY PANEL

(71) Applicant: Darwin Precisions Corporation, Hsinchu County (TW)

(72) Inventors: Ming-Chin Tsai, Hsinchu County (TW); Chia-Hsin Jow, Hsinchu County (TW); Chi-Chang Chen, Hsinchu County (TW); Chia-Hsin Chang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 225 days.

(21) Appl. No.: 18/238,816

(22) Filed: Aug. 28, 2023

(65) Prior Publication Data

US 2024/0071263 A1 Feb. 29, 2024

(30) Foreign Application Priority Data

Aug. 29, 2022 (TW) ................................ 111132552

(51) Int. Cl.
*G06F 1/16* (2006.01)
*G09F 9/30* (2006.01)
(Continued)

(52) U.S. Cl.
CPC .................................. *G09F 9/301* (2013.01)

(58) Field of Classification Search
CPC .............................. G09F 9/301; G06F 1/1652
See application file for complete search history.

(56) References Cited

U.S. PATENT DOCUMENTS 9,651,733 B2 5/2017 Liu
10,132,991 B2 * 11/2018 Jeon .................... G02B 6/0088
(Continued)

FOREIGN PATENT DOCUMENTS

CN 104678616 A 6/2015
CN 104882070 A 9/2015
(Continued)

OTHER PUBLICATIONS

China Patent Office “Office Action” issued on Oct. 18, 2024, China.
(Continued)

*Primary Examiner* — Anthony M Haughton
(74) *Attorney, Agent, or Firm* — WPAT, PC

(57) ABSTRACT

The present invention provides a display panel, including a backplane having flexibility, a first fixing member, a front frame having flexibility, and a display module provided between the backplane and the front frame. The backplane has a base plate with a first side. The first fixing member extends corresponding to the first side and has a first predetermined curvature. The first fixing member at least has a first wall body standing upright relative to the base plate, and the first fixing member is relatively fixed to the backplane, so that the curvature of the backplane can be adjusted corresponding to the first fixing member. The front frame is provided in a manner that extends correspondingly to the periphery of the backplane, and is relatively fixed to the backplane, so that the curvature of the front frame is relatively adapted to that of the backplane.

19 Claims, 19 Drawing Sheets

(51) Int. Cl.

| | |
|---|---|
| ***H05K 5/00*** | (2025.01) |
| ***H05K 7/00*** | (2006.01) |

(56) References Cited

U.S. PATENT DOCUMENTS

| | | | | |
|---|---|---|---|---|
| 10,302,848 | B2 * | 5/2019 | Yoon | G02F 1/133308 |
| 10,359,176 | B2 * | 7/2019 | Cha | F21V 13/08 |
| 10,366,650 | B2 | 7/2019 | Ahn | |
| 10,514,564 | B2 | 12/2019 | Kawasaki et al. | |
| 2009/0316062 | A1 * | 12/2009 | Nishizawa | G02F 1/133305 349/58 |
| 2011/0096262 | A1 * | 4/2011 | Kikuchi | G09F 9/35 349/61 |
| 2014/0118910 | A1 * | 5/2014 | Sung | G02F 1/133305 361/679.01 |
| 2014/0133073 | A1 * | 5/2014 | Ahn | H05K 5/0221 361/679.01 |
| 2015/0346538 | A1 * | 12/2015 | Hsiao | G02F 1/133308 312/7.2 |
| 2016/0004117 | A1 * | 1/2016 | Yu | G02F 1/133308 428/596 |
| 2016/0085110 | A1 * | 3/2016 | Shin | G02F 1/133308 349/58 |
| 2018/0101047 | A1 * | 4/2018 | Li | G02F 1/133308 |
| 2019/0064577 | A1 | 2/2019 | Kim | |
| 2022/0223073 | A1 * | 7/2022 | Wang | G09F 9/33 |
| 2023/0232550 | A1 * | 7/2023 | Hu | G02F 1/133328 |

FOREIGN PATENT DOCUMENTS

| | | | |
|---|---|---|---|
| CN | 106663395 | A | 5/2017 |
| TW | M491853 | U | 12/2014 |
| TW | I681241 | B | 1/2020 |

OTHER PUBLICATIONS

China National Intellectual Property Administration has issued 2nd Office Action for the corresponding China application on Mar. 18, 2025.

* cited by examiner

DISPLAY PANEL

CROSS-REFERENCE TO RELATED APPLICATION

This application claims the priority benefit of Taiwan application serial no. 111132552 filed on Aug. 29, 2022. The entirety of the above-mentioned patent application is hereby incorporated by reference herein and made a part of this specification.

TECHNICAL FIELD

The present invention relates to a display panel. Specifically, the present invention relates to a display panel including a fixing member with a predetermined curvature.

BACKGROUND

In recent years, in order to enhance the sense of envelopment or to apply to non-planar setting surfaces, the application of a curved display device or non-planar display device has gradually emerged. In order to implement the curved display device or non-planar display device, it is necessary to design, develop, and manufacture various components of the display device with a predetermined curvature. However, if each component included in the display device is designed, developed, and manufactured separately to have the predetermined curvature, manufacturing cost, manufacturing procedures, and manufacturing complexity will be increased. For example, it is necessary to establish multiple molds of predetermined curvatures for different components. In view of the foregoing, this increased cost, procedures and complexity also make it difficult to develop display devices for various predetermined curvatures, or make the threshold for implementing the display devices with different predetermined curvatures higher. Therefore, in order to implement more diverse curved display devices or non-planar display devices, it is necessary to develop a structure or process that can reduce cost, procedures, and complexity, in order to more flexibly implement display devices for different predetermined curvatures that may be required.

SUMMARY

To solve the above problem, a display panel is provided according to one embodiment of the present invention, including: a backplane, having flexibility, and having a base plate, the base plate having a first side; a first fixing member, extending corresponding to the first side and having a first predetermined curvature, the first fixing member having at least a first wall body, the first wall body standing upright relative to the base plate, and being relatively fixed to the backplane, so that the curvature of the backplane is adjusted corresponding to the first fixing member; a front frame, having flexibility, and provided in a manner of extending corresponding to the periphery of the backplane and being relatively fixed to the backplane, so that the curvature of the front frame is relatively adapted to that of the backplane; and a display module, provided between the backplane and the front frame.

According to the display panel provided in various embodiments of the present invention, the curvatures of other components can be correspondingly adjusted based on at least one fixing member, and thus the display panels with various curvatures can be implemented with a simple structure. In view of the foregoing, according to various embodiments of the present invention, the display panels with different curvatures can be implemented with fixing members of different curvatures, and it is possible to reduce or avoid the need to develop or prepare other components in advance to have the predetermined curvatures. For example, it is possible to reduce or avoid the need to establish molds of different curvatures for other components. Therefore, when the display panel is applied to curved display device or non-planar display device, more diverse changes in predetermined curvature can be achieved with lower manufacturing cost, manufacturing procedures, and manufacturing complexity according to various embodiments of the present invention. Thereby, a variety of curved display devices or non-planar display devices with predetermined curvatures can be prepared more flexibly as required.

DETAILED DESCRIPTION

Various embodiments will be described below, and those skilled with general knowledge in the art should be able to easily understand the spirit and principles of the present invention by referring to description with figure. However, although specific embodiments will be specified herein, these embodiments are only illustrative and are not considered restrictive or exhaustive in all aspects. In addition, the proportion and relative proportion of each component shown in the figure can be exaggerated or changed for clarity and simplicity. Therefore, for those skilled with general knowledge in the art, without departing from the spirit and principle of the present invention, the various changes and modifications of the present invention should be obvious and easily achieved.

Figure 1:
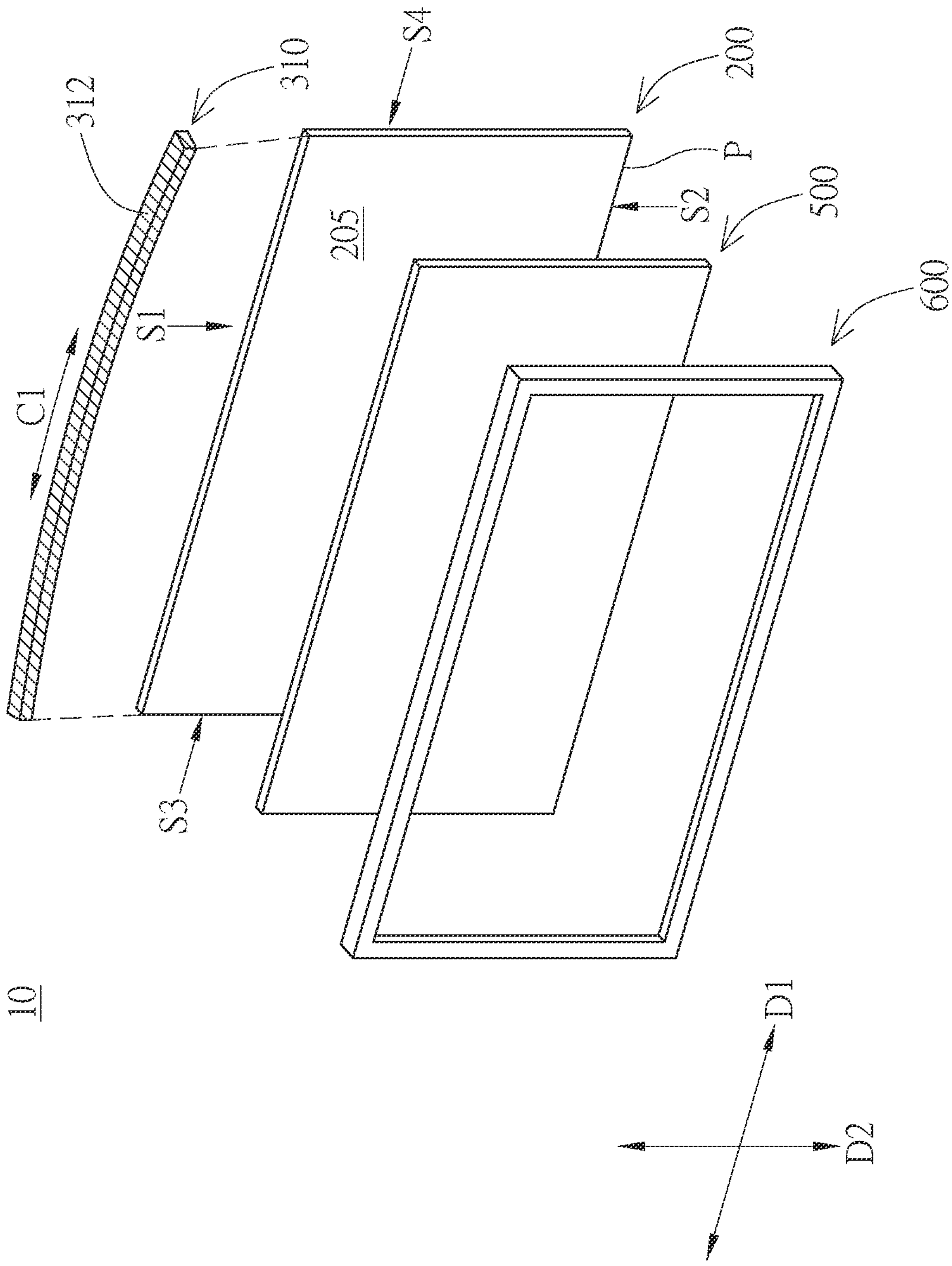
FIG. 1 is an explosion schematic diagram of a display panel according to one embodiment of the present invention.

Referring to FIG. 1, a display panel 10 is provided according to one embodiment of the present invention, including a backplane 200, a first fixing member 310, a front frame 600, and a display module 500 provided between the backplane 200 and the front frame 600. In view of the foregoing, the display module 500 may be any module that can perform displaying or emit light, and the backplane 200 and the front frame 600 can support, protect, or position the display module 500. In addition, according to other embodiments of the present invention, other modules, devices, or elements commonly found in the display panel can be provided, and those skilled with ordinary knowledge in the technical field should be able to clearly understand their possible settings and changes.

Specifically, the backplane 200 may have at least a base plate 205. For example, referring to FIG. 1, the base plate 205 may be a rectangular board, and its periphery P roughly has a first side S1 and a second side S2 extending in a first direction D1, and a third side S3 and a fourth side S4 extending in a second direction D2. However, this is only an example, and according to other embodiments of the present invention, is not limited to this, and the base plate 205 may be a board of any shape, and can be configured to carry, protect, or position modules, devices, or elements in the display panel 10.

According to this embodiment, the first fixing member 310 can be provided on the side of the backplane 200. By way of examples, the first fixing member 310 can be provided on one side of the base plate 205 facing the display module 500 or the front frame 600, and can extend corresponding to the first side S1. In view of the foregoing, the first fixing member 310 may have a first predetermined curvature C1. According to some embodiments, the center of the first predetermined curvature C1 may be located on one side of the base plate 205 facing the display module 500 or the front frame 600.

In view of the foregoing, the first fixing member 310 may have at least a first wall body 312. The first wall body 312 mentioned above may be an elongated wall body structure extending along the side. In the assembled state, the first wall body 312 stands upright relative to the base plate 205, and is relatively fixed to the backplane 200 along the first side S1 of the backplane 200.

In detail, the backplane 200 may have flexibility such that it can be easily bend, folded or deformed corresponding to the first fixing member 310. For example, the backplane 200 may have a Young's modulus less than that of the first fixing member 310. Therefore, the curvature of the backplane 200 having flexibility can be adjusted corresponding to the first fixing member 310. By way of examples, the first fixing member 310 may be made of a metal material such as, but not limited to, iron, and may be integrally molded, while the backplane 200 may be made of a polyimide material softer than the metal material and has grooves. Thereby, the backplane 200 may have flexibility that it can be easily bend and folded corresponding to the first fixing member 310. However, this is only an example, and according to other embodiments of the present invention, the way or pattern that the flexibility of the backplane 200 or the flexibility of the framework and front frame 600 described later are higher than that of the fixing member is not limited to this.

Figure 2:
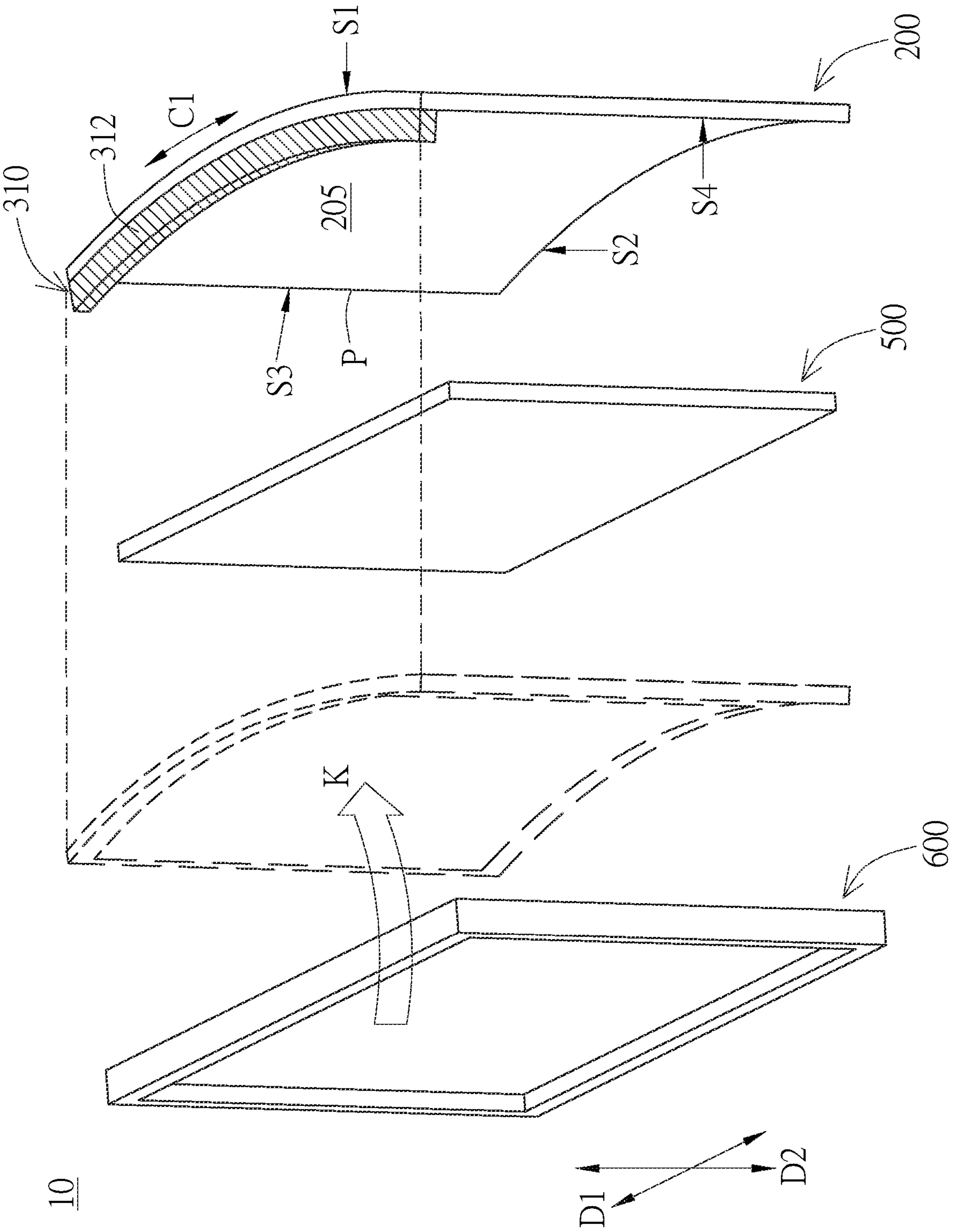
FIGS. 2 and 3 are assembly schematic diagrams of a display panel according to one embodiment of the present invention.
Figure 3:
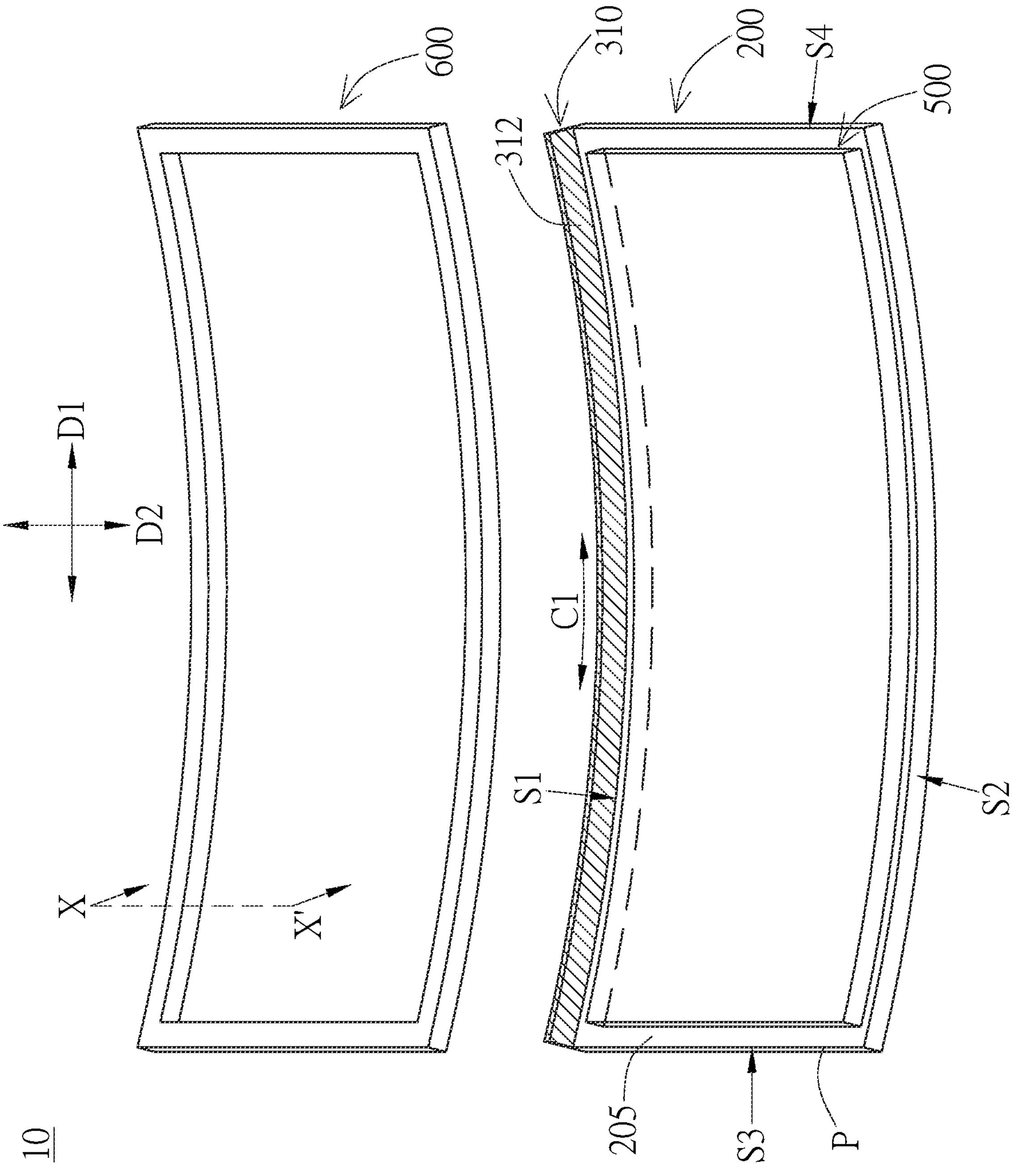

In view of the foregoing, referring to FIGS. 2 and 3, when fixed along the first side S1 with the first fixing member 310, the flexible backplane 200 originally not having the first predetermined curvature C1 will be bend, folded or deformed with the first fixing member 310, so that the backplane 200 has a curvature or shape corresponding to the first predetermined curvature C1 of the first fixing member 310.

According to this embodiment, the front frame 600 can be provided in a manner of extending corresponding to the periphery P of the backplane 200, and similar to the backplane 200, the front frame 600 may have flexibility that it can be easily bend, folded or deformed corresponding to the first fixing member 310. For example, the front frame 600 may have a Young's modulus less than that of the first fixing member 310. Thereby, as shown in FIG. 2, when the front frame 600 is relatively fixed to the backplane 200, the front frame 600 can undergo deformation K with the molded backplane 200. Therefore, as shown in FIG. 3, where relatively assembled and fixed, the curvature of the front frame 600 can be relatively adapted to that of the backplane 200.

According to some embodiments, after relatively fixed to the first fixing member 310, the backplane 200 may also have the first predetermined curvature C1, and after the front frame 600 is relatively fixed to the backplane 200 or even the first fixing member 310, the front frame 600 may also have the first predetermined curvature C1. However, the present invention is not limited to this, and based on the influence of the thickness during assembly and other modules, devices, or elements provided in the middle, the backplane 200 and the front frame 600 may also have curvatures varying corresponding to the first predetermined curvature C1 but not completely equivalent to the first predetermined curvature C1. In view of the foregoing, those skilled with general knowledge in the art should be able to clearly understand the changes in these tolerances, which will not be elaborated further here.

For the convenience of display and illustration, the above FIGS. 1 to 3 are schematic diagrams showing at least partial separation and disassembly of the backplane 200, the first fixing member 310, the display module 500, and the front frame 600. In addition, the display module 500 may be a module where many devices or elements used for display are integrated, rather than a single plate-shaped element. Therefore, individual devices or elements in the display module 500 may or may not be deformed corresponding to the molded backplane 200 and the front frame 600. In view of the foregoing, those skilled with general knowledge in the art should be able to clearly understand the changes, and it will not be elaborated further here.

Figure 4:
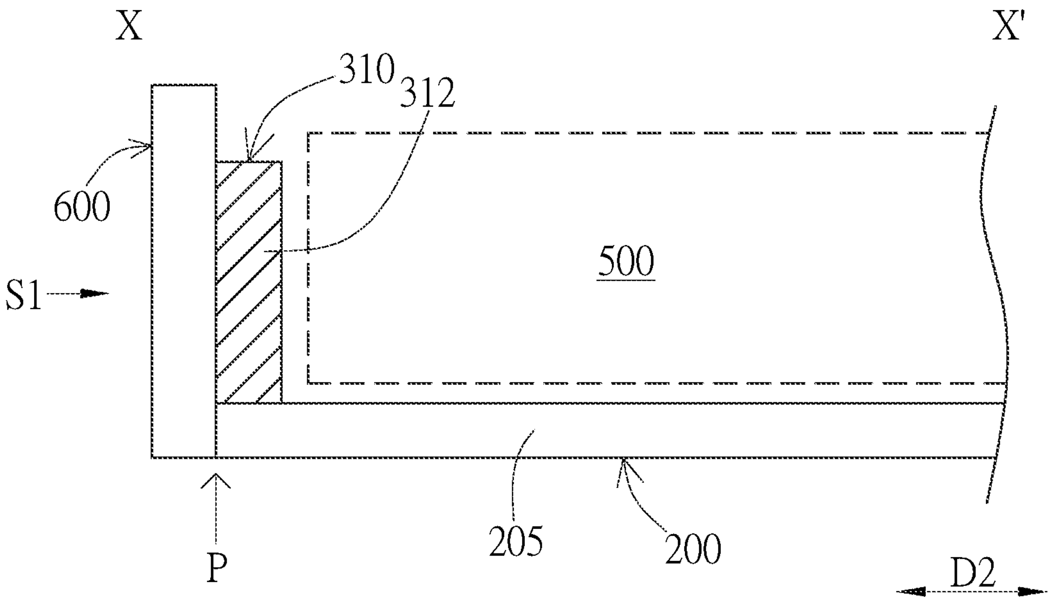
FIG. 4 is a cross-sectional schematic diagram of a display panel according to one embodiment of the present invention.

Next, referring to FIG. 4, in which a schematic diagram of the cross section taken along the cross-sectional line X-X' of the display panel 10 of FIG. 3 is shown. According to an embodiment, the backplane 200, the first fixing member 310, the display module 500, and the front frame 600 can be relatively fixed by any known or future developed means, such as screw locking, colloid adhesion, hooking, welding, etc., and this should be understood by those skilled with general knowledge in the art, which will not be elaborated further herein. In view of the foregoing, according to this embodiment, where completely assembled, the first fixing member 310 can stand upright on the base plate 205 of the backplane 200, and the front frame 600 can be provided relatively to cover the base plate 205 and the first fixing member 310. By way of examples, the front frame 600 can cover the outer wall surface of the first wall body 312 of the first fixing member 310 along the first side S1. Therefore, according to this embodiment, relative fixation and curvature adjustment can be achieved with a relatively simplified structure, and the well-known sidewall portion of the backplane 200 is replaced with the first wall body 312 of the first fixing member 310, thereby reducing process cost and the thickness of the display panel 10.

According to other embodiments of the present invention, the pattern and assembly form of the backplane 200 and the front frame 600 that can be matched with the first fixing member 310 are not limited to this. For example, the front frame 600 may also cover the top wall surface of the first wall body 312 of the first fixing member 310 along the first side S1, or cover a sidewall portion 210 of the backplane 200 protruding from the base plate 205 along the first side S1. In view of the foregoing, more aspects will be further described below, and those skilled with general knowledge in the art will understand further variations of the present invention that may be applied from thereon.

Figure 5:
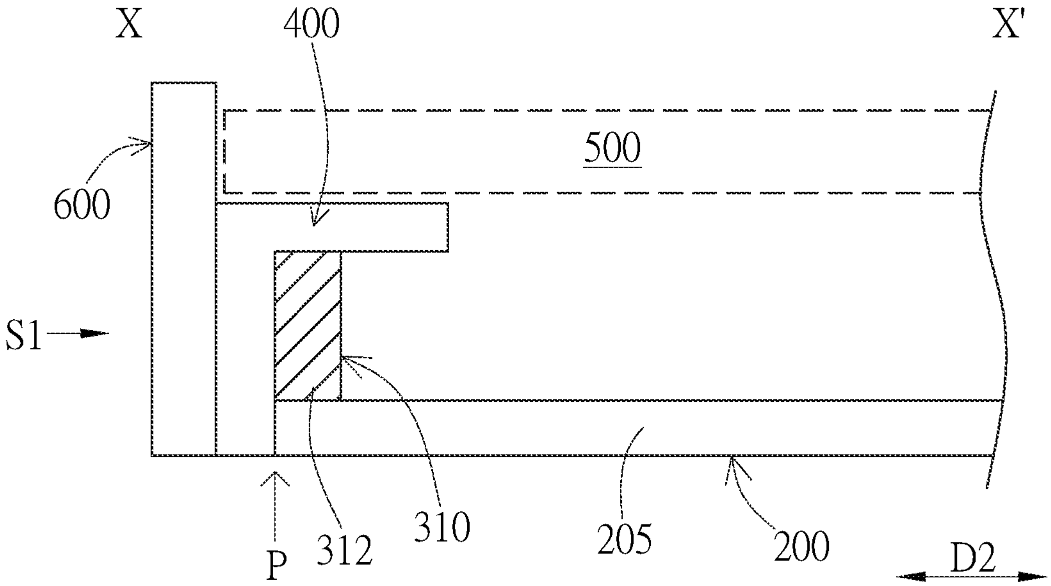
FIG. 5 is a cross-sectional schematic diagram of a display panel according to another embodiment of the present invention.
Figure 6:
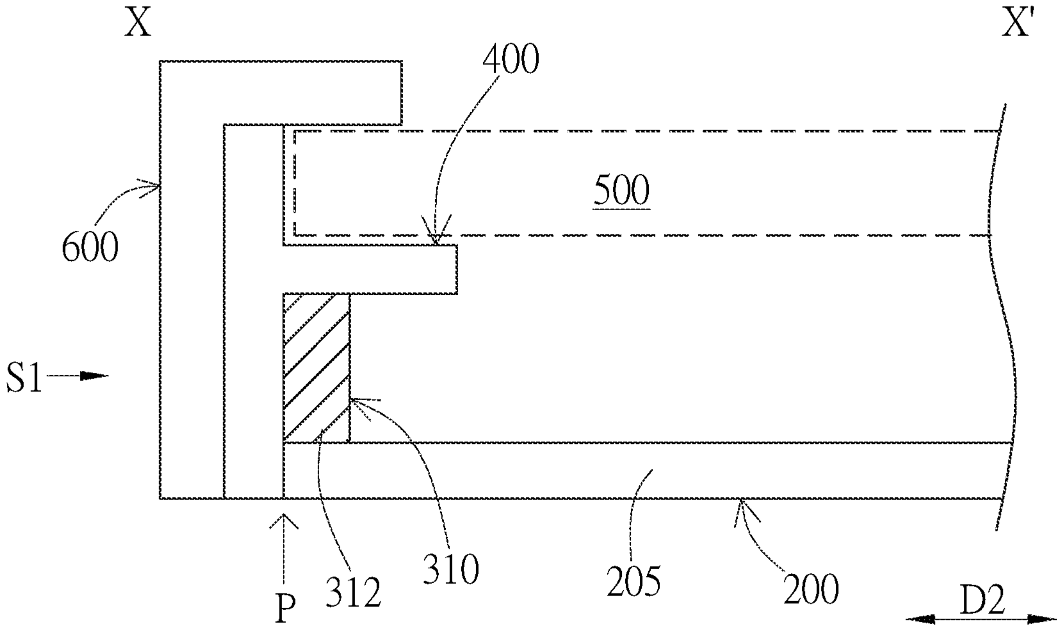
FIG. 6 is a cross-sectional schematic diagram of a display panel according to yet another embodiment of the present invention.

In view of the foregoing, referring to FIGS. 5 and 6, according to yet another embodiment of the present invention, the display panel 10 may actually further include a framework 400 having flexibility. The framework 400 is provided between the backplane 200 and the front frame 600 in a manner of extending corresponding to the periphery P of the backplane 200. Based on this architecture, different setting spaces can be further partitioned by the framework 400 to configure different modules, and the display module 500 can be, for example, provided between the front frame 600 and the framework 400. In view of the foregoing, the framework 400 having flexibility can be relatively fixed to the backplane 200 or even the first fixing member 310. Therefore, similar to the front frame 600 mentioned above, the curvature of the framework 400 having flexibility can be relatively adapted to that of the backplane 200.

In addition to being relatively fixed by the first fixing member 310 to adjust the curvature, the relative configuration patterns of these different front frames 600, frameworks 400, and backplanes 200 should be known to those skilled with general knowledge in the art, which will not be elaborated further here.

Next, referring to FIGS. 7A to 7J, according to different embodiments of the present invention, the curvature of the display panel 10 can be adjusted by setting the first fixing member 310 with different shapes and relative configuration patterns. In view of the foregoing, for simplicity and clarity, FIGS. 7A to 7J will only show relative configuration of the first fixing member 310 and the backplane 200.

As mentioned above, referring to FIG. 7A, according to a variant T1, in addition to the base plate 205, the backplane 200 can further have the first sidewall portion 210, and the first sidewall portion 210 protrudes from the base plate 205 on the first side S1 and stands upright. The inner wall surface F1 of the first wall body 312 of the first fixing member 310 and the outer wall surface A2 of the first sidewall portion 210 can be attached to each other, thereby adjusting the curvature of the backplane 200 with the first fixing member 310. In view of the foregoing, according to this embodiment, by simply attaching the first wall body 312 in a simple wall shape and the first sidewall portion 210, relative fixation and curvature adjustment can be achieved in a relatively simplified form, and the stability of the display panel 10 can be further enhanced by the face-shaped attachment of the inner wall surface F1 and the outer wall surface A2.

Figure 7A:
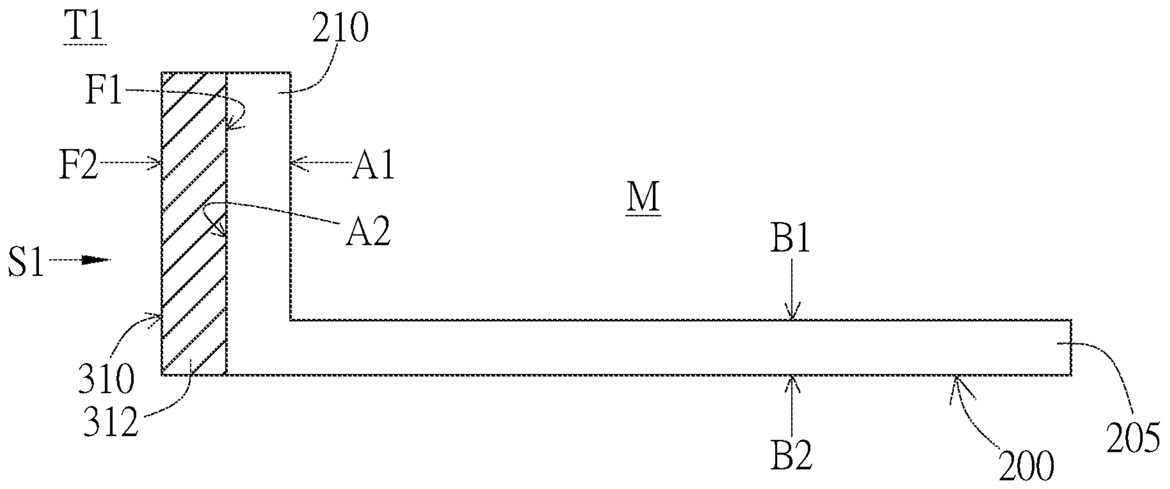
FIGS. 7A to 7J are cross-sectional schematic diagrams of display panels according to various varying embodiments of the present invention.
Figure 7B:
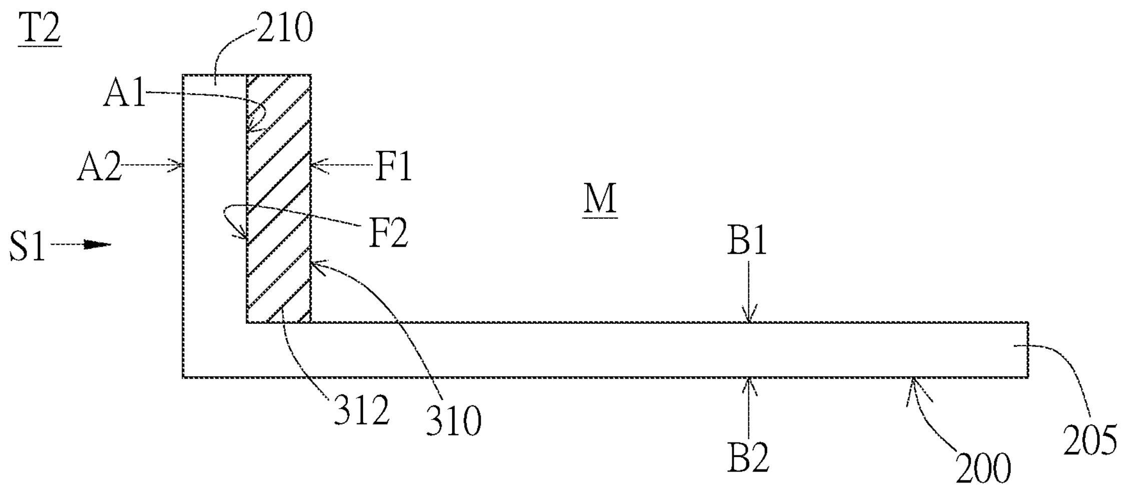

Next, referring to FIG. 7B, according to a variant T2, it may be similar to the variant T1 mentioned above, except that the outer wall surface F2 of the first wall body 312 of the first fixing member 310 and the inner wall surface A1 of the first sidewall portion 210 can be attached to each other, thereby adjusting the curvature of the backplane 200 with the first fixing member 310. In this implementation, the first sidewall portion 210 of the backplane 200 and the base plate 205 define a chamber M, and the first wall body 312 of the first fixing member 310 is substantially provided in the chamber M. In view of the foregoing, the first wall body 312 of the first fixing member 310 abuts against the inner wall surface A1 of the first sidewall portion 210 and the front surface B1 of the base plate 205 facing the display module. Therefore, according to this embodiment, relative fixation and curvature adjustment can be achieved in a relatively simplified form, and based on the fact that the first wall body 312 of the first fixing member 310 abuts against both the inner wall surface A1 of the first sidewall portion 210 of the backplane 200 and the front surface B1 of the base plate 205, the curvature change of the backplane 200 can be more accurately adjusted, and unexpected deformation of the backplane 200 can be avoided.

Figure 7C:
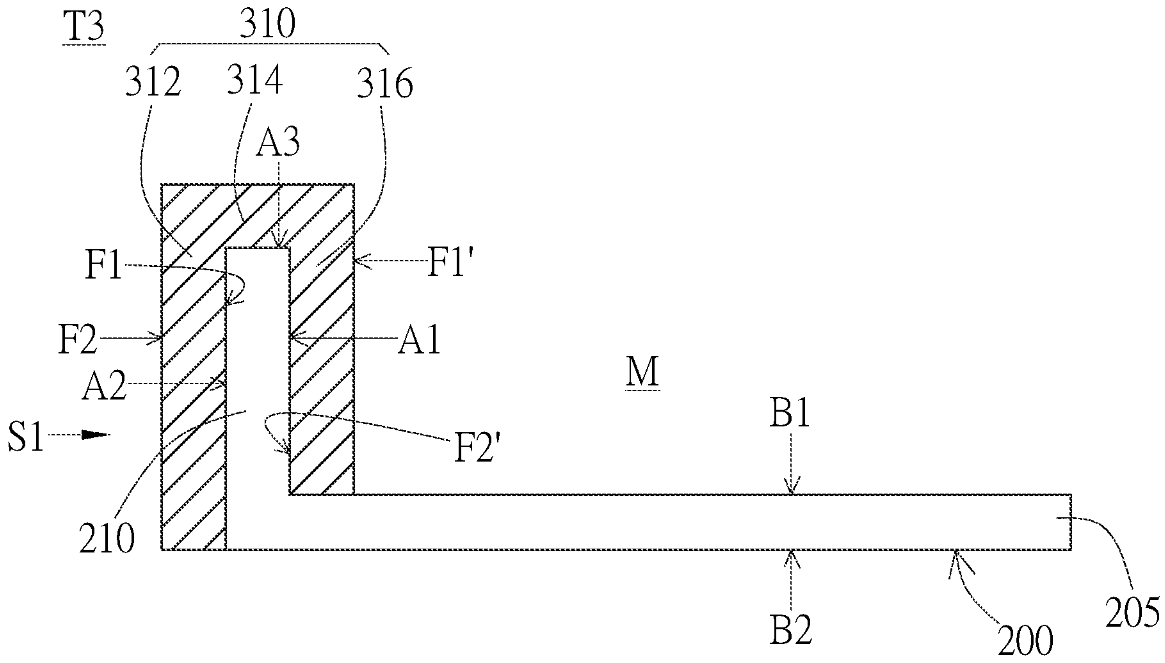

Furthermore, referring to FIG. 7C, according to a variant T3, it is different from the variant T1 in that the first fixing member 310 may further have a cover plate 314 connected to the first wall body 312, and a first opposite wall body 316 connected to the cover plate 314. In detail, the cover plate 314 can be covered and stacked on the top surface A3 of the first sidewall portion 210, and the first wall body 312 and the first opposite wall body 316 protrude oppositely from both sides of the cover plate 314, and stand upright downwards corresponding to the outer wall surface A2 and the inner wall surface A1 of the first sidewall portion 210. In view of the foregoing, the inner wall surface F1 of the first wall body 312 and the outer wall surface F2' of the first opposite wall body 316 are attached to the outer wall surface A2 and inner wall surface A1 on two opposite sides of the first sidewall portion 210, respectively. Thereby, according to this embodiment, the first sidewall portion 210 can be clamped by the first fixing member 310, and the first opposite wall body 316 can further abut against both the inner wall surface A1 of the first sidewall portion 210 of the backplane 200 and the front surface B1 of the base plate 205 of the backplane 200, thereby more stably maintaining the expected curvature of the backplane 200 and avoiding unexpected deformation of the backplane 200.

Figure 7D:
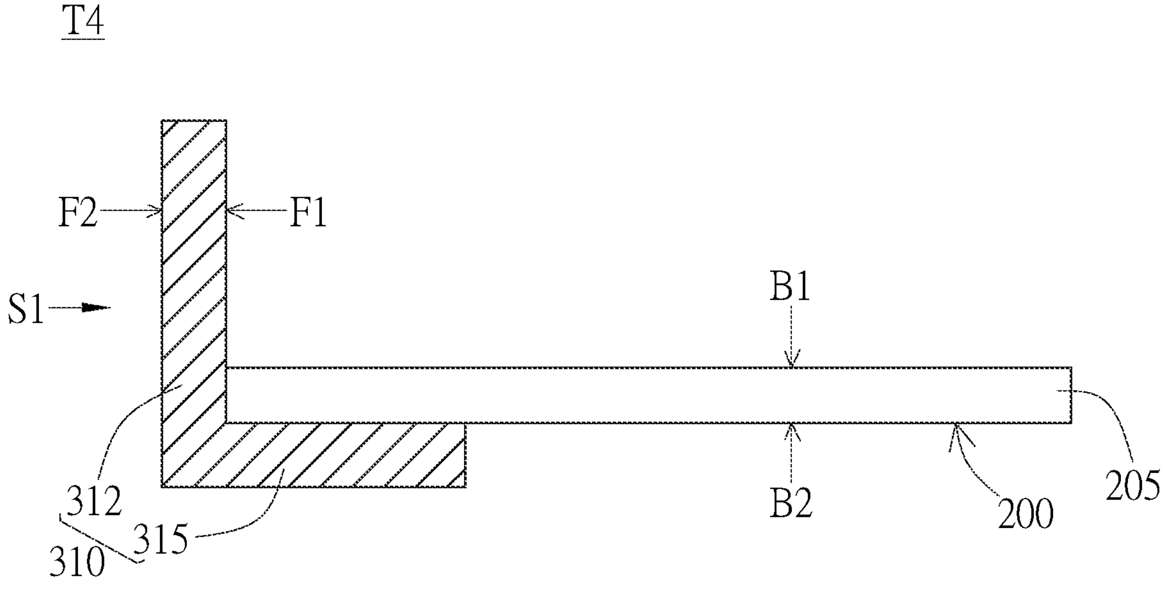

Next, referring to FIG. 7D, according to the variant T4, the backplane 200 may only have the base plate 205 but does not have the first sidewall portion 210. In view of the foregoing, according to this embodiment, the first fixing member 310 may have a first wall body 312 and a support portion 315 connected to the first wall body 312, and the first wall body 312 protrudes relative to the support portion 315 and stands upright. The first wall body 312 can replace the first sidewall portion 210 of the backplane 200 as a support for the sidewall, while the support portion 315 is provided along the first side S1 and is attached to at least part of the base plate 205 back-facing the bottom surface B2 of the display module. Therefore, according to this embodiment, the first wall body 312 can be used as a support for the sidewall to omit the setting of the first sidewall portion 210, thereby reducing materials used and the thickness of the overall architecture. Moreover, the curvature change of the backplane 200 can be maintained by the base plate 205 abutting against both the first wall body 312 and the support portion 315.

Figure 7E:
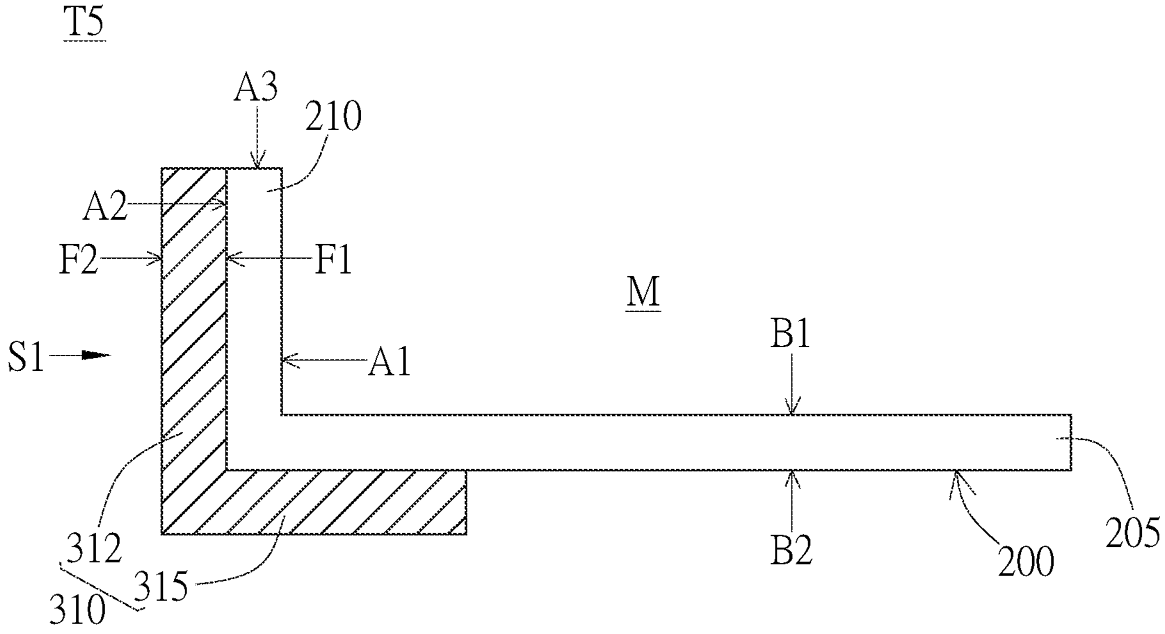

Further, referring to FIG. 7E, according to yet another variant T5, it is different from the variant T4 in that the backplane 200 has the first sidewall portion 210. In view of the foregoing, according to this embodiment, the support portion 315 is provided along the first side S1 and attached to at least part of the bottom surface B2 of the base plate 205, and the inner wall surface F1 of the first wall body 312 and the outer wall surface A2 of the first sidewall portion 210 can be attached to each other, thereby adjusting the curvature of the backplane 200 with the first fixing member 310. Therefore, according to this embodiment, by attaching the first wall body 312 in a wall shape to the first sidewall portion 210, and by further supporting the base plate 205 with the support portion 315, the curvature change of the backplane 200 can be further stabilized and maintained.

Figure 7F:
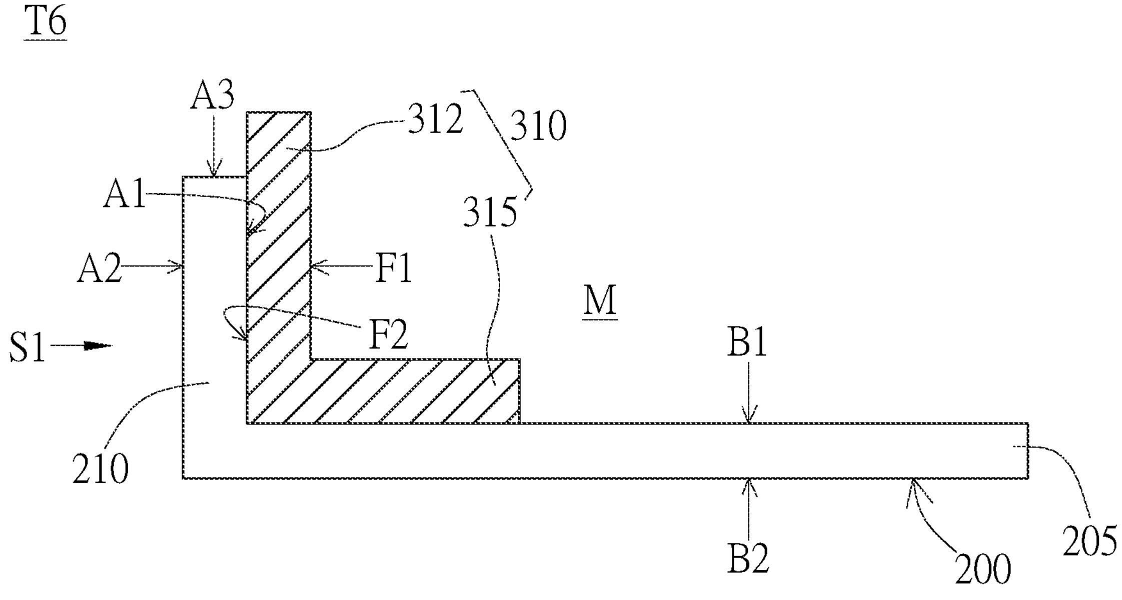
Figure 7G:
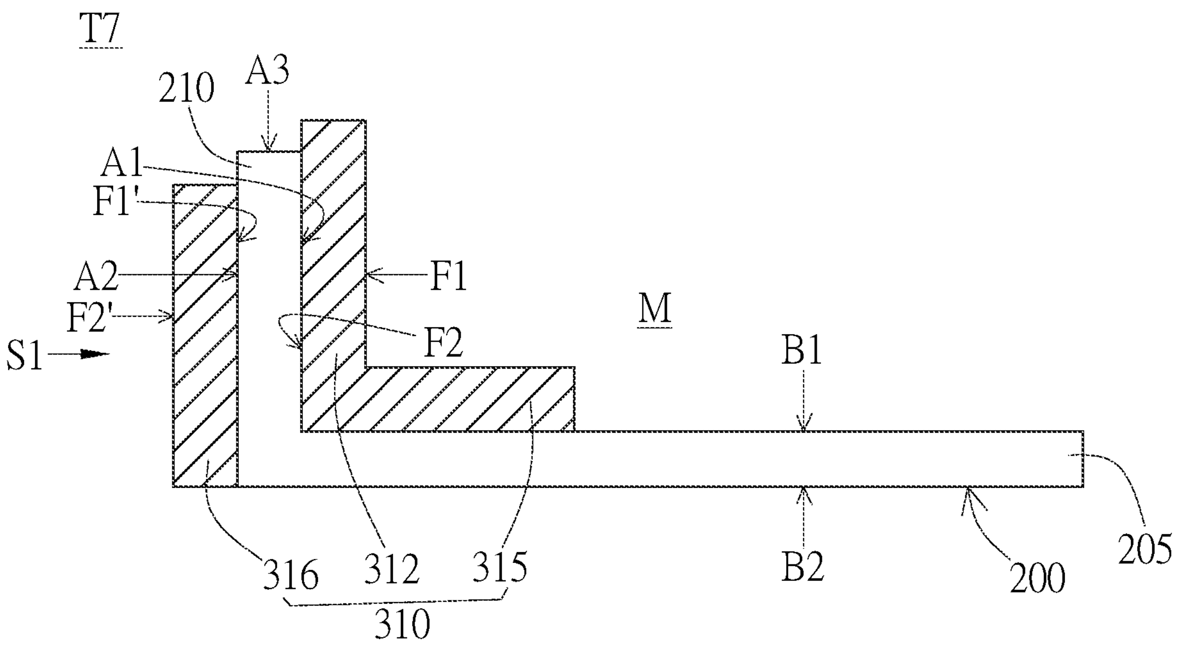

Similarly, referring to FIG. 7F, according to a further variant T6, it is different from the variant T5 in that the first fixing member 310 is provided in the chamber M defined by the first sidewall portion 210 and the base plate 205. In view of the foregoing, according to this embodiment, the support portion 315 is provided along the first side S1 and attached to at least part of the front surface B1 of the base plate 205, and the outer wall surface F2 of the first wall body 312 and the inner wall surface A1 of the first sidewall portion 210 can be attached to each other, thereby adjusting the curvature of the backplane 200 with the first fixing member 310. Therefore, according to this embodiment, by attaching the first wall body 312 in a wall shape to the first sidewall portion 210, and by allowing the first sidewall portion 210 and the base plate 205 to abut against the first wall body 312 and the support portion 315 of the first fixing member 310 on the inner side of the backplane 200 where is easily deformed unintentionally, the curvature change of the backplane 200 can be further enhanced, stabilized and maintained.

Further, the foregoing implementations can also be combined to create variations. For example, referring to FIG. 7G, according to a variant T7, in relation to the aforementioned variant T6, the first fixing member 310 may further have the first opposite wall body 316 separated from the first wall body 312 and the support portion 315, in addition to having the first wall body 312 and the support portion 315 connected to the first wall body 312. Specifically, the support portion 315 can be provided along the first side S1 and attached to at least part of the front surface B1 of the base plate 205, and the outer wall surface F2 of the first wall body 312 and the inner wall surface F1' of the first opposite wall body 316 can be attached to the inner wall surface A1 and the outer wall surface A2 of the first sidewall portion 210, respectively. Therefore, according to this embodiment, if the space and cost allow, the curvature change of the backplane 200 can be further enhanced, stabilized and maintained by joint implementation of the setting ways of different patterns of parts of the first fixing member 310.

Figure 7H:
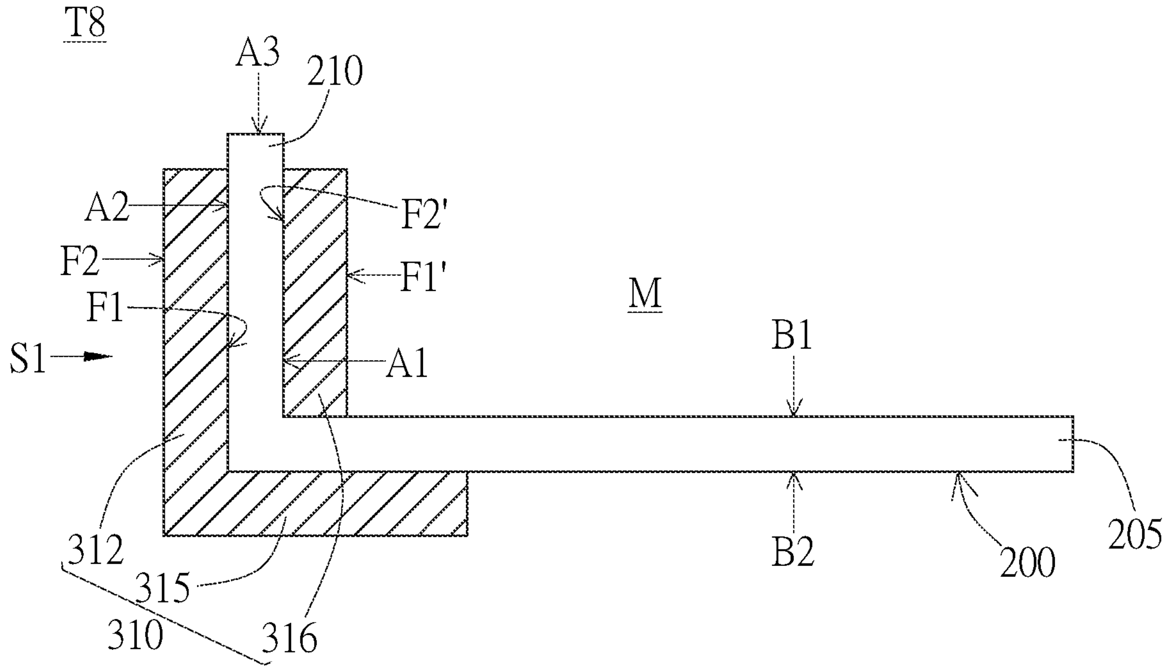

Similarly, referring to FIG. 7H, according to a variant T8, in relation to the aforementioned variant T5, the first fixing member 310 may further have the first opposite wall body 316 separated from the first wall body 312 and the support portion 315, in addition to having the first wall body 312 and the support portion 315 connected to the first wall body 312. Specifically, the support portion 315 can be provided along the first side S1 and attached to at least part of the bottom surface B2 of the base plate 205, and the inner wall surface F1 of the first wall body 312 and the outer wall surface F2' of the first opposite wall body 316 can be attached to the outer wall surface A2 and the inner wall surface A1 of the first sidewall portion 210, respectively. Therefore, according to this embodiment, if the space and cost allow, the curvature change of the backplane 200 can be further enhanced, stabilized and maintained by joint implementation of the setting ways of different patterns of parts of the first fixing member 310.

Figure 7I:
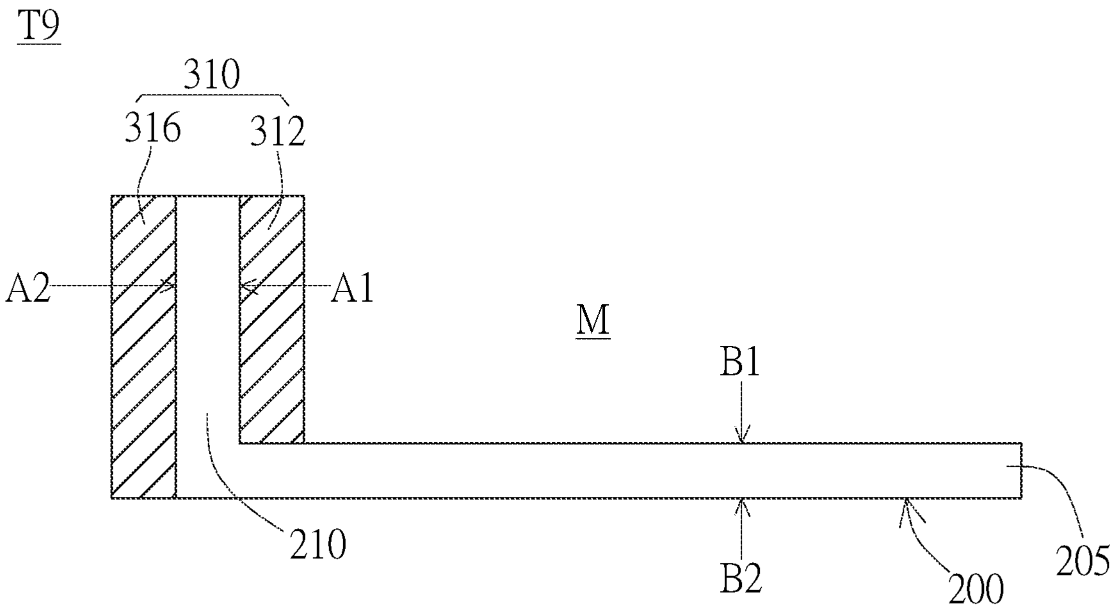

Further, referring to FIG. 7I, according to yet another variant T9, the first fixing member 310 can also be provided similar to a combination form of the aforementioned variants T1 and T2. Specifically, in relation to the aforementioned variant T2, in addition to the first wall body 312 abutting against the inner wall surface A1 of the first sidewall portion 210, the first fixing member 310 of this embodiment can further have a first opposite wall body 316 provided outside the first sidewall portion 210 and abutting against the outer wall surface A2 of the first sidewall portion 210. Therefore, according to this embodiment, if the space and cost allow, the curvature change of the backplane 200 can be further enhanced, stabilized and maintained by joint implementation of the setting ways of different patterns of parts of the first fixing member 310.

Figure 7J:
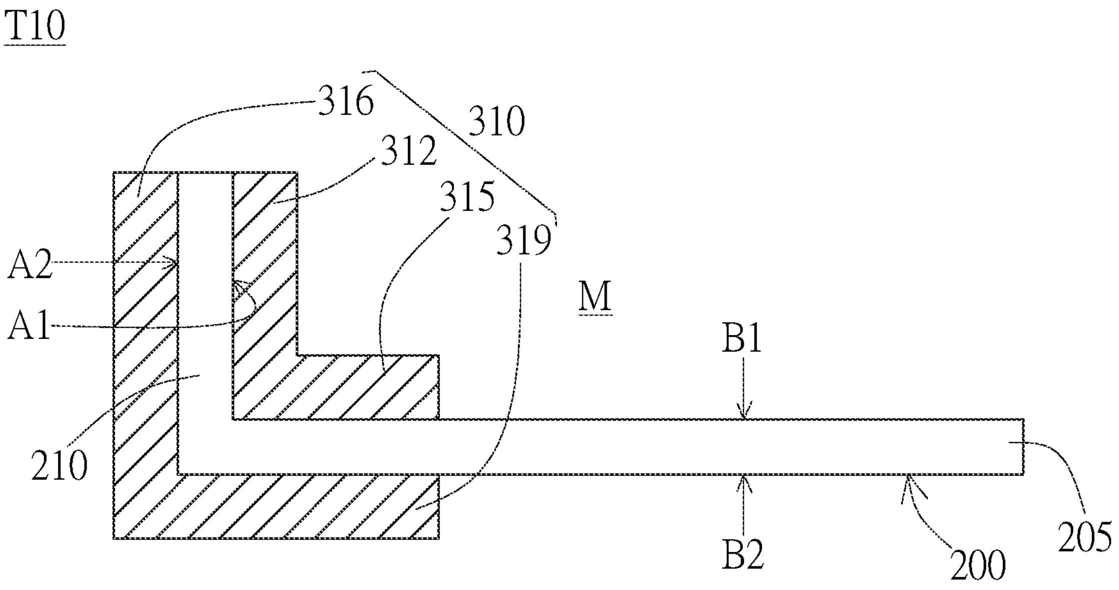

Next, referring to FIG. 7J, according to a further variant T10, the first fixing member 310 can also be provided similar to a combination form of the aforementioned variants T5 and T6. Specifically, in relation to the aforementioned variant T6, in addition to the first wall body 312 abutting against the inner wall surface A1 of the first sidewall portion 210 and the support portion 315 abutting against the front surface B1 of the base plate 205, the first fixing member 310 of this embodiment can further have a first opposite wall body 316 provided outside the first sidewall portion 210 and abutting against the outer wall surface A2 of the first sidewall portion 210, and further has a support portion 319 connected to the first opposite wall body 316 and abutting against the back surface B2 of the base plate 205. Therefore, according to this embodiment, if the space and cost allow, the curvature change of the backplane 200 can be further enhanced, stabilized and maintained by joint implementation of the setting ways of different patterns of parts of the first fixing member 310.

In view of the foregoing, according to various embodiments of the present invention, the curvature of other flexible components can be adjusted by simply providing the first fixing member 310 with the predetermined curvature, thereby implementing display panels with various curvatures. Therefore, only different fixing members need to be prepared for the predetermined curvature, which can reduce or avoid the need to establish molds or processes for different curvatures of each component, and more diverse changes in the curvatures of the display panels can be achieved based on various components mass-produced in the same process.

Figure 8:
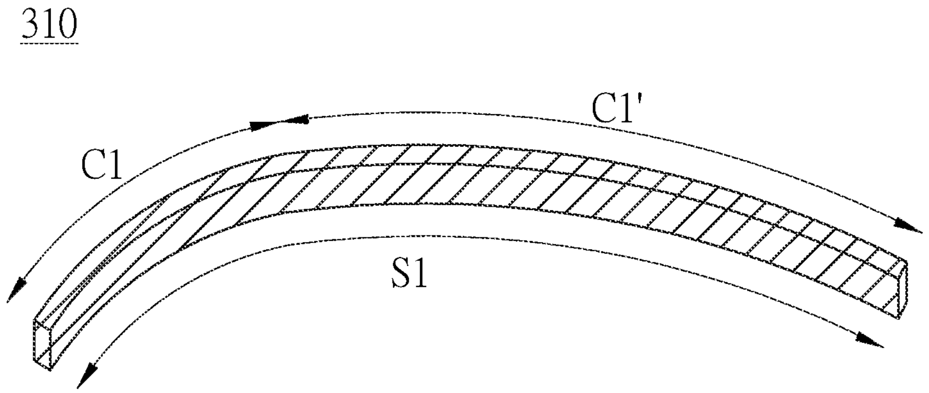
FIG. 8 is a schematic diagram of a variant of a fixing member according to another embodiment of the present invention.

According to some embodiments of the present invention, the first fixing member 310 that is provided in a manner of fixedly extending along the first side S1 of the base plate 205 to adjust the curvature of the backplane 200 accordingly may have a fixed first predetermined curvature C1. However, the present invention is not limited to this. By way of examples, the first predetermined curvature of the first fixing member 310 in the foregoing embodiments can also vary along the first side S1. For example, referring to FIG. 8, the first fixing member 310 may have different first predetermined curvatures C1 and C1' along the first side S1 with the curvature to be adjusted. Therefore, more precise and rich curvature changes of the display panel can be achieved by the first fixing member 310, and can be applied to a wider range of scenarios or occasions. For example, such display panels may be mounted on a wall with a non-uniform degree of curvature or in a wall corner for display.

Figure 9:
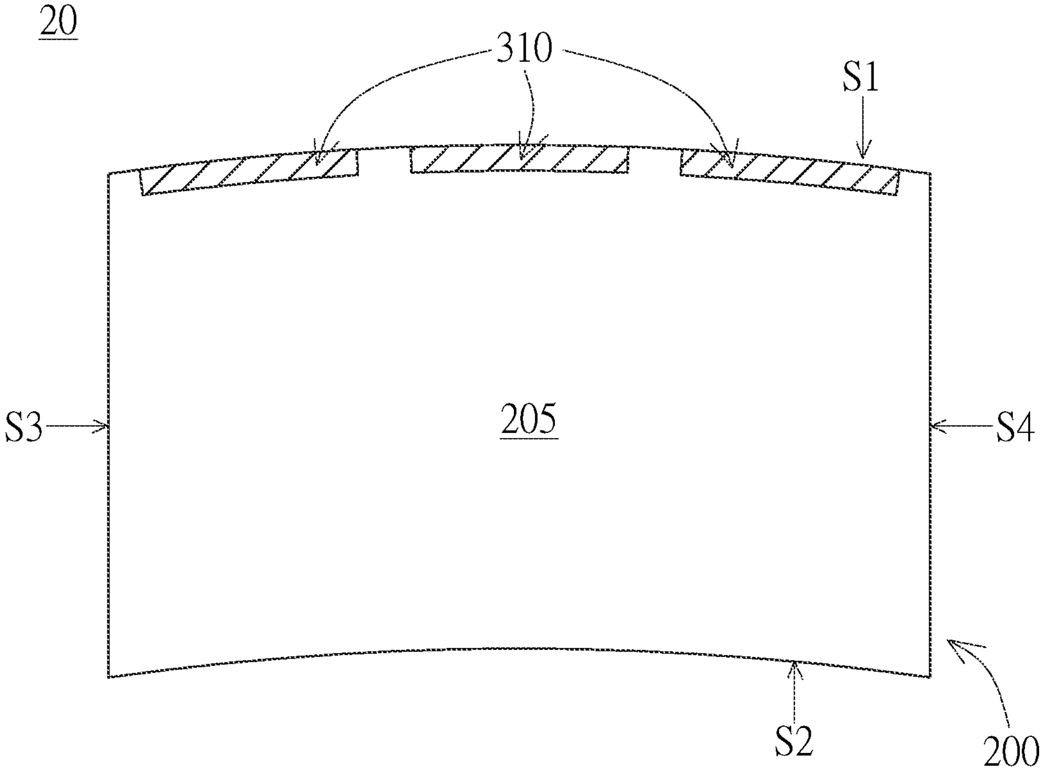
FIG. 9 is a schematic diagram of set positions of fixing members on a display panel according to one embodiment of the present invention.

Furthermore, referring to FIG. 9, the display panel 20 according to yet another embodiment of the present invention may substantially include a plurality of first fixing members 310 provided sequentially along the first side S1. By way of examples, the plurality of first fixing members 310 can be provided on the first side S1 in a spaced manner, and the extension direction is roughly parallel to the arrangement direction of the plurality of first fixing members 310, or roughly parallel to the extension direction of the first side S1 with the curvature that has been correspondingly changed. In view of the foregoing, the first fixing members 310 mentioned above may have the same or different first predetermined curvatures. Thereby, the plurality of first fixing members 310 may be configured in a spaced manner to reduce the material used in providing the first fixing members 310, or the thickness of the device. In addition, the curvature of other components such as the backplane 200 in different local parts can also be adjusted respectively based on the plurality of different first fixing members 310.

Figure 10:
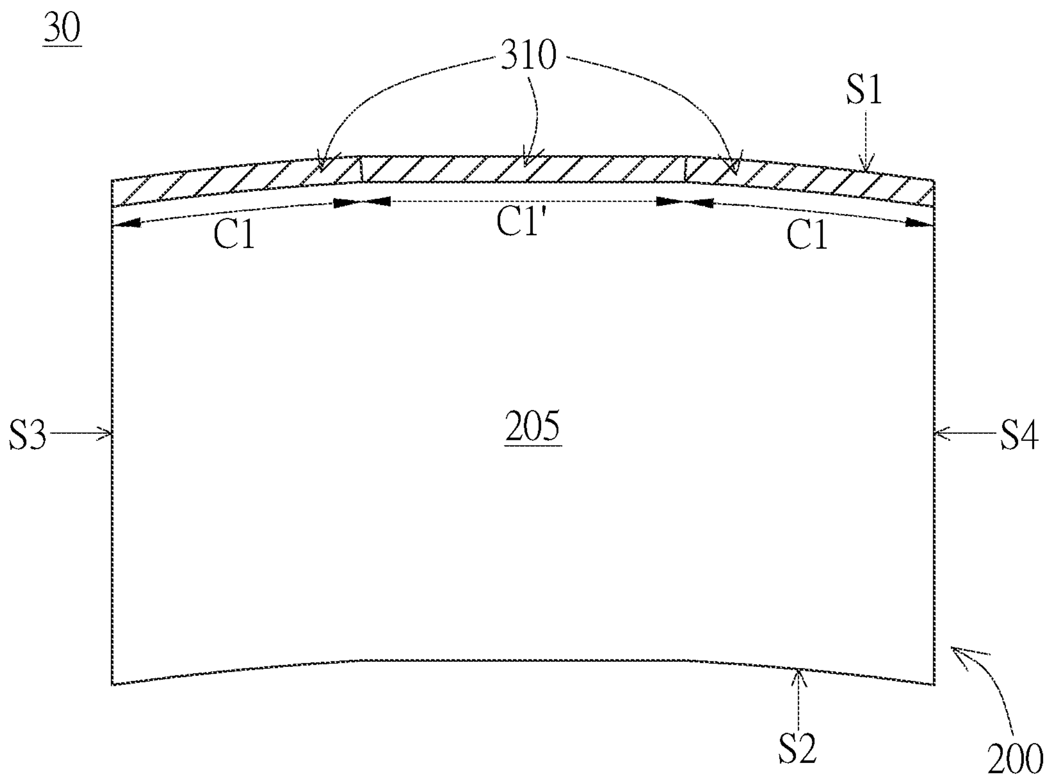
FIG. 10 is a schematic diagram of set positions of fixing members on a display panel according to one embodiment of the present invention.

Similarly, referring to FIG. 10, similar to the above-mentioned display panel 20, the display panel 30 according to another embodiment of the present invention may also include the plurality of first fixing members 310 provided sequentially along the first side S1. By way of examples, the plurality of first fixing members 310 can be configured in the display panel 30 in an adjacently connected manner, and the extension direction is roughly parallel to the arrangement direction of the plurality of first fixing members 310, or roughly parallel to the extension direction of the first side S1 with the curvature that has been correspondingly changed. In view of the foregoing, the first fixing member 310 mentioned above may have the same or different first predetermined curvatures. For example, the first predetermined curvature C1' and the first predetermined curvature C1. Thereby, the plurality of first fixing members 310 can be configured adjacently to accurately adjust the curvature of other components such as the backplane 200 in different local parts in detail.

In the foregoing various implementations, the first fixing member 310 is provided on the first side S1 to adjust the curvature of the display panel. However, according to other embodiments of the present invention, the fixing members can also be provided on other sides to adjust the curvature of the display panel. By way of examples, the fixing members can also be provided on the second side S2, the third side S3, or the fourth side S4 alone. For another example, if the base plate 205 has an expected shape different from that of a rectangle, the fixing member can also be provided on any side corresponding to the expected shape to adjust the curvature of the display panel. In view of the foregoing, those skilled with general knowledge in the art should be able to understand from the above description the manner in which the display panel is provided and the possible variants, which will not be elaborated further herein.

Figure 11:
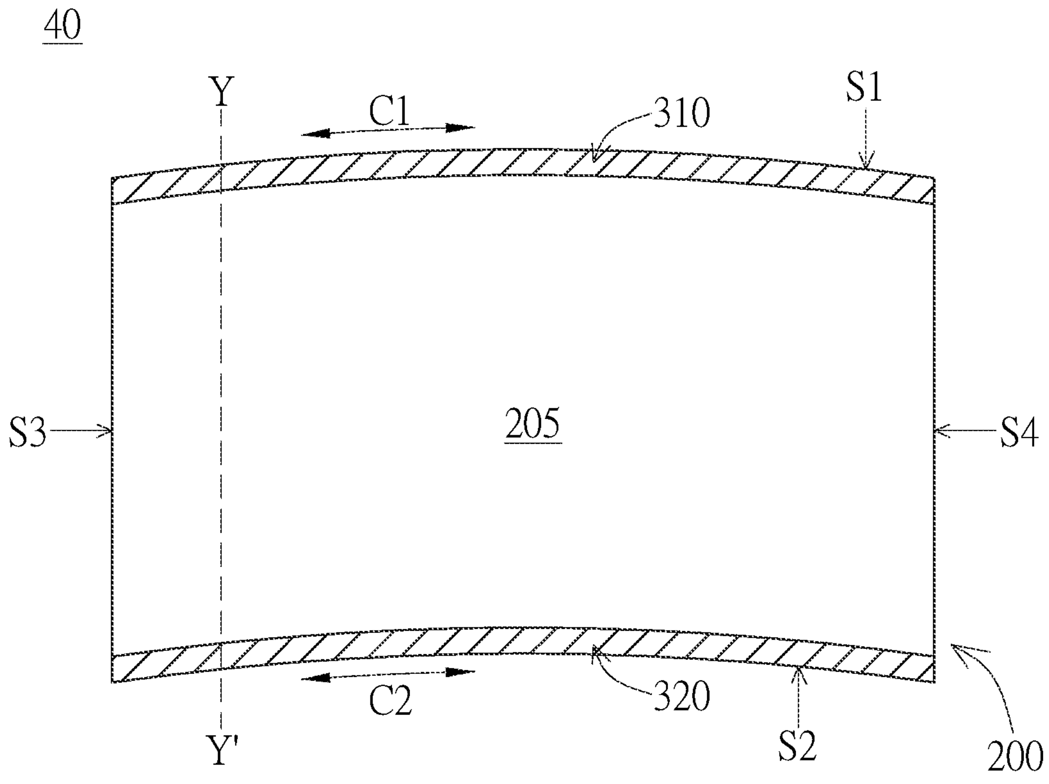
FIG. 11 is a schematic diagram of set positions of fixing members on a display panel according to one embodiment of the present invention.

Further, according to other embodiments of the present invention, the fixing members can also be provided on different sides. By way of examples, referring to FIG. 11, according to the display panel 40 of yet another embodiment of the present invention, the base plate 205 has the second side S2 that is opposite but not connected to the first side S1, and fixing members can be provided on both the first side S1 and the second side S2. Specifically, the display panel 40 may be provided with the first fixing member 310 on the first side S1 as described in other embodiments, and may be further provided with a second fixing member 320 on the second side S2.

Figure 12:
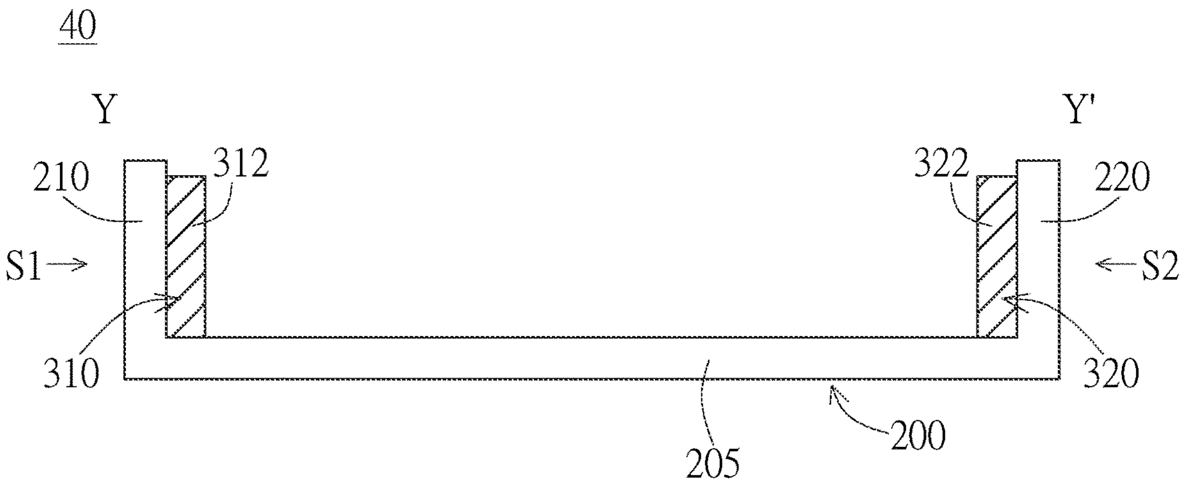
FIG. 12 is a schematic diagram of the cross section taken along the cross-sectional line Y-Y' of the display panel of FIG. 11.

In view of the foregoing, the second fixing member 320 may extend corresponding to the second side S2 and have a second predetermined curvature C2. Referring to FIG. 12, similar to the first fixing member 310, the second fixing member 320 may have at least a second wall body 322. The second wall body 322 can stand upright relative to the base plate 205 and fixed relative to the backplane 200, so that the curvature of the backplane 200 can be adjusted corresponding to the second fixing member 320. For example, the first wall body 312 of the first fixing member 310 and the second wall body 322 of the second fixing member 320 can abut against, along the first side S1 and the second side S2, the inner wall surfaces of the first sidewall portion 210 and a second sidewall portion 220 of the backplane 200, respectively. However, the form and setting pattern of the second fixing member 320 according to other embodiments of the present invention are not limited to this. In view of the foregoing, except that the sides provided are different, similar to the first fixing member 310, the second fixing member 320 may have various setting ways and variants, and this can be understood and inferred from the above.

In addition, according to some embodiments, the second predetermined curvature C2 may be the same as or different from the first predetermined curvature C1 to adjust the curvature for different sides of the base plate 205, respectively.

Figure 13A:
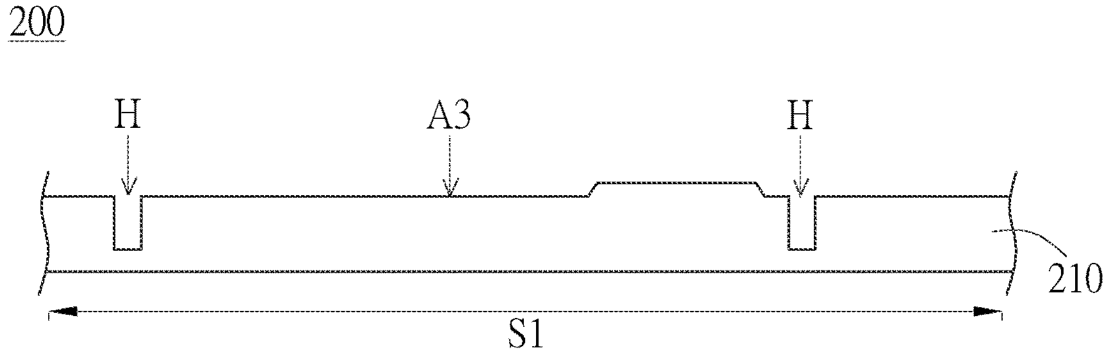
FIGS. 13A to 13C are schematic diagrams of a plurality of grooves provided in a backplane, a front frame, and a framework according to various embodiments of the present invention.

As mentioned above, by means of a more rigid fixing member such as the first fixing member 310 or the second fixing member 320, the curvatures of the backplane 200, the front frame 600 and the framework 400 having flexibility may be adjusted correspondingly. The backplane 200, the front frame 600, and the framework 400 having flexibility mentioned above can be implemented in various ways or forms. For example, materials with high flexibility such as polyimide (PI) can be used to make the backplane 200, the front frame 600, and the framework 400. In addition, a corresponding structure can also be designed for a part that is difficult to be bend and folded. For example, referring to FIG. 13A, the sidewall portion of the backplane 200, such as the first sidewall portion 210 protruding and standing upright along the first side S1, may have a plurality of grooves H, so that the top surface A3 of the first sidewall portion 210 opposite to the base plate extends discontinuously.

Figure 13B:
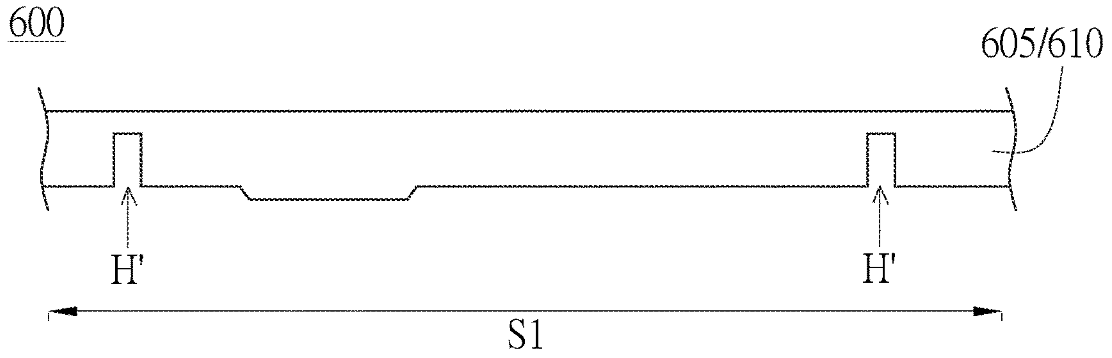

Similarly, referring to FIG. 13B, according to different implementations, the front frame 600 may have a top frame portion 605 facing the base plate of the backplane, a side frame portion 610 standing upright relative to the base plate, or a combination thereof. In view of the foregoing, the top frame portion 605, the side frame portion 610, or a combination thereof may also have a plurality of grooves H' along the first side S1, so that the front frame 600 extends discontinuously along the edge of the first side S1.

Figure 13C:
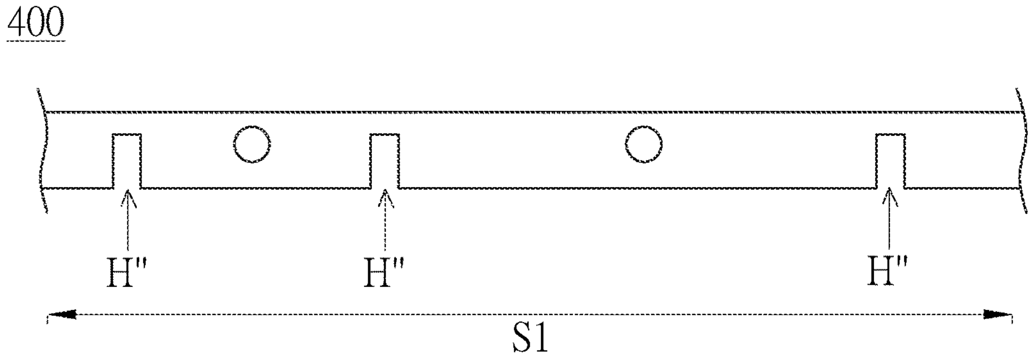

In view of the foregoing, referring to FIG. 13C, the framework 400 that can be optionally provided may also have a similar structure. In detail, the framework 400 may also have a plurality of grooves H" along the first side S1, so that the framework 400 extends discontinuously along the edge of the first side S1.

Figure 14A:
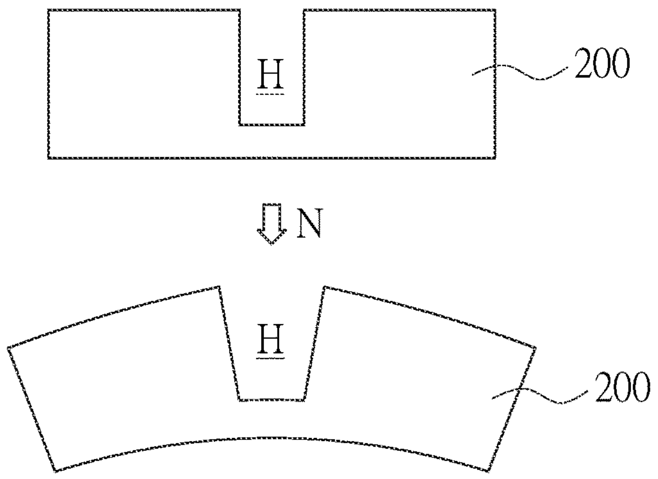
FIGS. 14A to 14B are schematic diagrams of a backplane, a front frame and a framework having flexibility by providing the grooves according to various embodiments of the present invention.
Figure 14B:
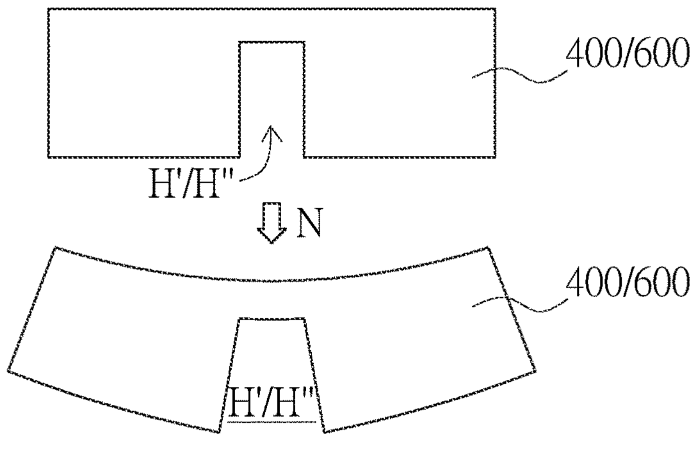

As mentioned above, in a case that it is expected that the fixing member is provided along the first side S1 and the backplane 200, the framework 400, and the front frame 600 are adjusted correspondingly, a plurality of grooves H, H', and H" can be provided on the backplane 200, the framework 400, and the front frame 600 along the first side S1. Therefore, the flexibility of the backplane 200, the framework 400, and the front frame 600 along the first side S1 can be promoted. Specifically, as shown in FIGS. 14A and 14B, in a case that the grooves H, H' and H" are provided, the backplane 200, the framework 400, and the front frame 600 may be more susceptible to bending, folding, or deformation N. Thereby, the curvature can be adjusted easier in conjunction with the fixing member having relatively high rigidity and having the predetermined curvature. In view of the foregoing, according to some embodiments, the part of the component having the grooves H, H', and H" can be stacked with the fixing members after being bent and folded in conjunction with the fixing members, so that the fixing members are overlapped to the grooves H, H', and H", thereby fixing the curvature and avoiding unexpected deformation at the grooves H, H', and H". However, the above-mentioned methods or structures for making the backplane 200, the framework 400, and the front frame 600 have flexibility are only examples, and the present invention is not limited to this.

Figure 15:
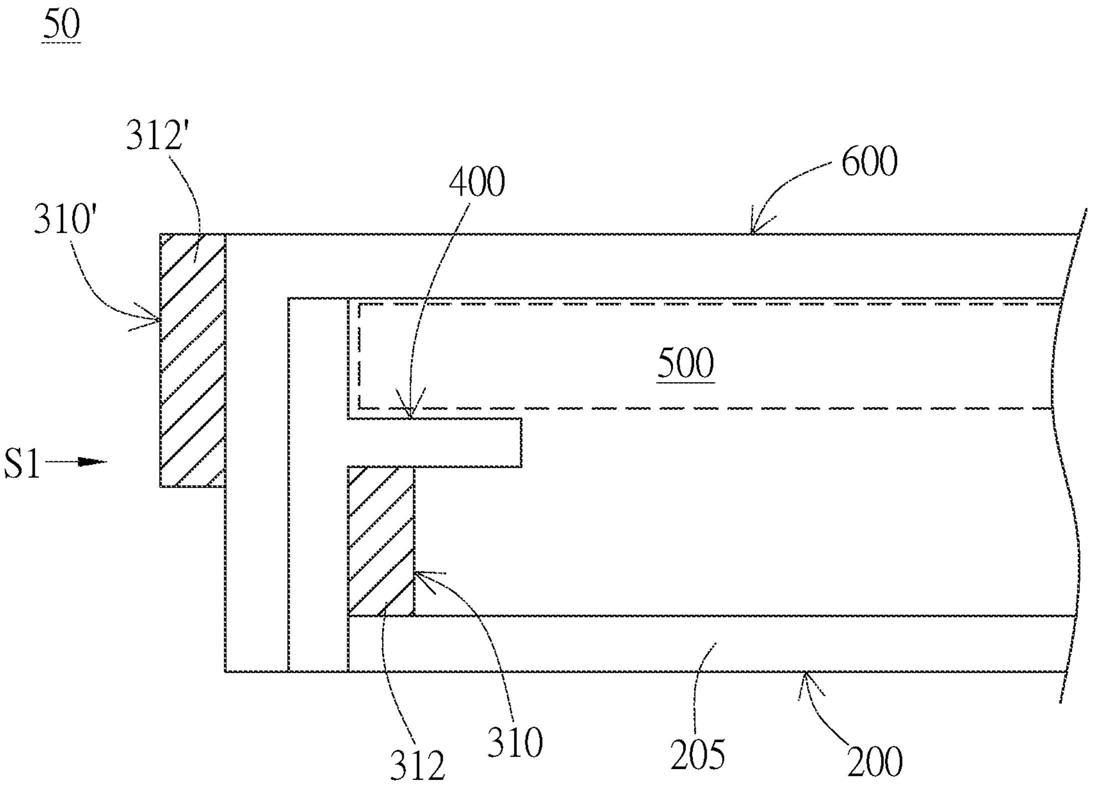
FIG. 15 is a cross-sectional schematic diagram of a display panel with an auxiliary fixing member according to another embodiment of the present invention.

Further, in addition to the above-mentioned fixing members mainly relatively fixed to the backplane 200, according to other embodiments of the present invention, a fixing member mainly relatively fixed to the front frame 600 can also be further provided. By way of examples, referring to FIG. 15, the display panel 50 may have the backplane 200, the framework 400, the display module 500, and the front frame 600. Corresponding to the first side S1, as described above, the first fixing member 310 is relatively fixed to the backplane 200. However, according to this embodiment, a first auxiliary fixing member 310' may be further included and extend corresponding to the first side S1, and may have a first predetermined curvature corresponding to the first predetermined curvature of the first fixing member 310. In view of the foregoing, the first auxiliary fixing member 310' may have at least a first auxiliary wall body 312' standing upright relative to the base plate 205, and relatively fixed to the front frame 600. Thereby, the curvature of the front frame 600 can be adjusted corresponding to the first auxiliary fixing member 310', and thus shaping of the predetermined curvature of the display panel 50 can be further improved and stabilized.

Next, reference will be further made to FIGS. 16A to 16H to illustrate some embodiments of the form and relative configuration relationship between the first auxiliary fixing member 310' and the front frame 600. In these figures, for clarity and brevity, except for the first auxiliary fixing member 310' and the front frame 600, the relative position of the base plate 205 of the backplane will be shown only schematically for reference, and other components are omitted.

Figure 16A:
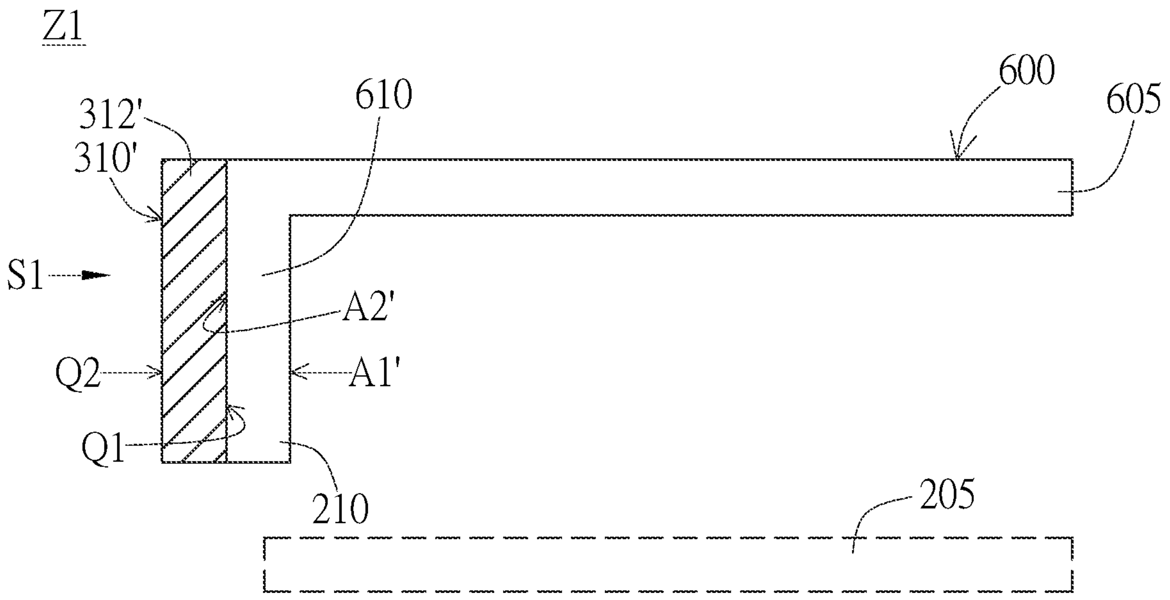
FIGS. 16A to 16H are cross-sectional schematic diagrams of display panels according to various varying embodiments of the present invention.
Figure 16B:
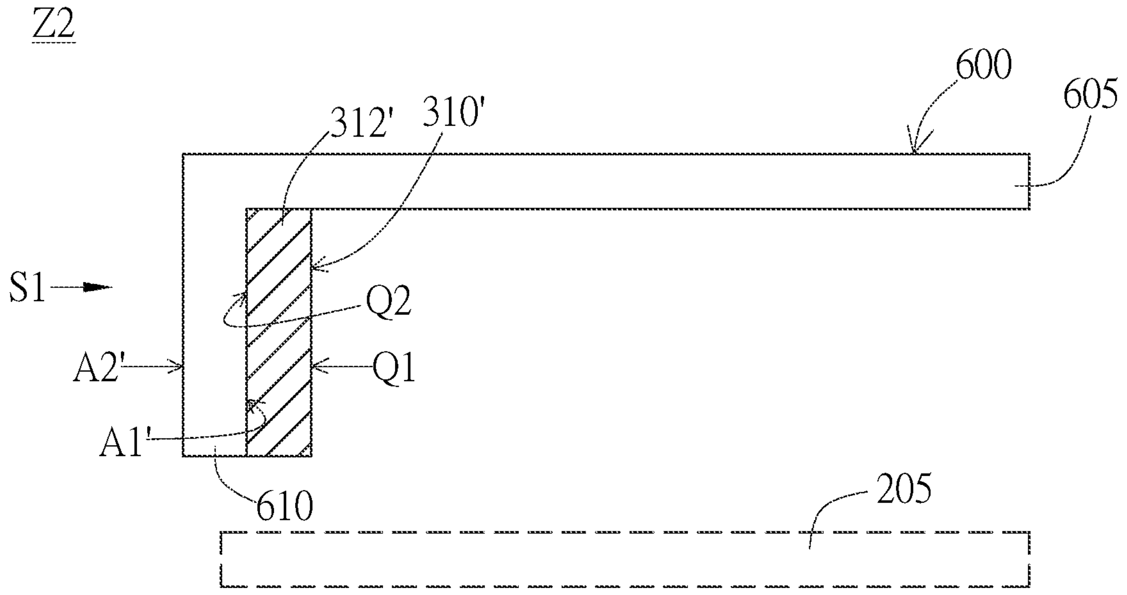

In view of the foregoing, as shown in FIGS. 16A and 16B, according to variants Z1 and Z2, the front frame 600 may have the top frame portion 605 facing the base plate 205 along the first side S1, and the side frame portion 610 standing upright relative to the base plate 205. In addition, first auxiliary fixing member 310' may have the first auxiliary wall body 312' provided along the side frame portion 610.

In the variant Z1 shown in FIG. 16A, the inner wall surface Q1 of the first auxiliary wall body 312' of the first auxiliary fixing member 310' and the outer wall surface A2' of the side frame portion 610 are attached to each other. Therefore, according to this embodiment, relative fixation and curvature adjustment can be achieved in a relatively simplified form.

In addition, in the variant Z2 shown in FIG. 16B, the outer wall surface Q2 of the first auxiliary wall body 312' of the first auxiliary fixing member 310' and the inner wall surface A1' of the side frame portion 610 are attached to each other. That is, the first auxiliary wall body 312' is attached to the inner wall surface A1' of one side of the side frame portion 610 facing the center of the base plate 205. Therefore, according to this embodiment, relative fixation and curvature adjustment can be achieved in a relatively simplified form, and based on the fact that the first auxiliary wall body 312' of the first auxiliary fixing member 310' abuts against both the side frame portion 610 and the top frame portion 605 of the front frame 600, curvature changes can be more accurately adjusted and unexpected deformation of the front frame 600 can be avoided.

Figure 16C:
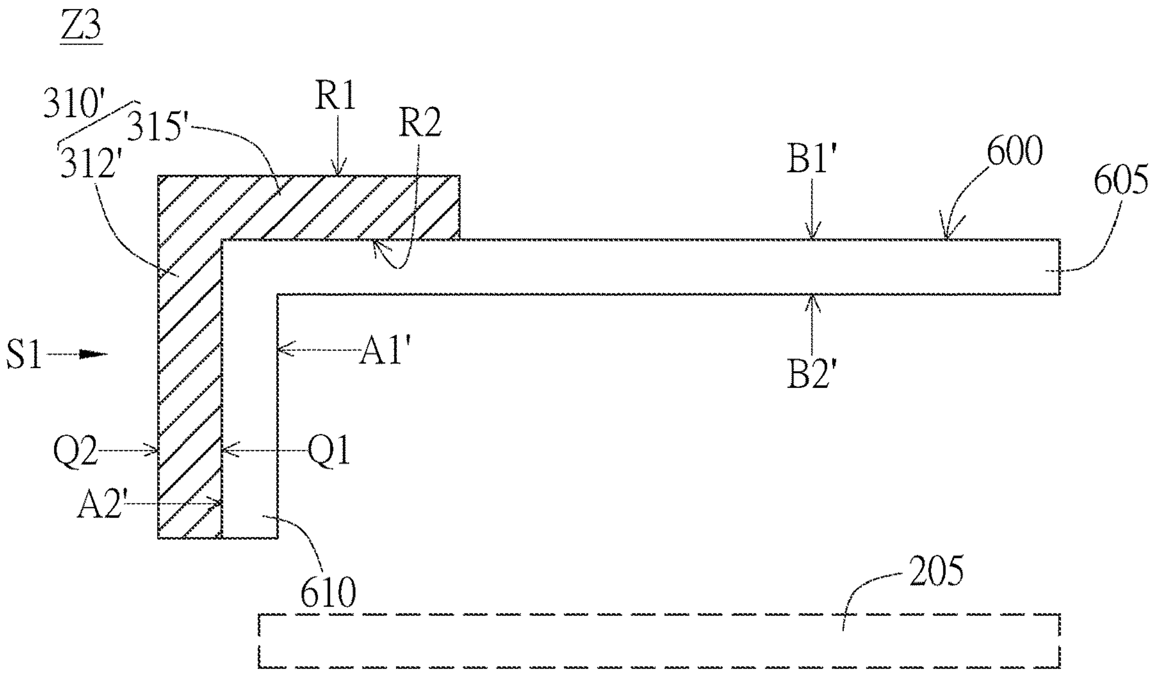
Figure 16D:
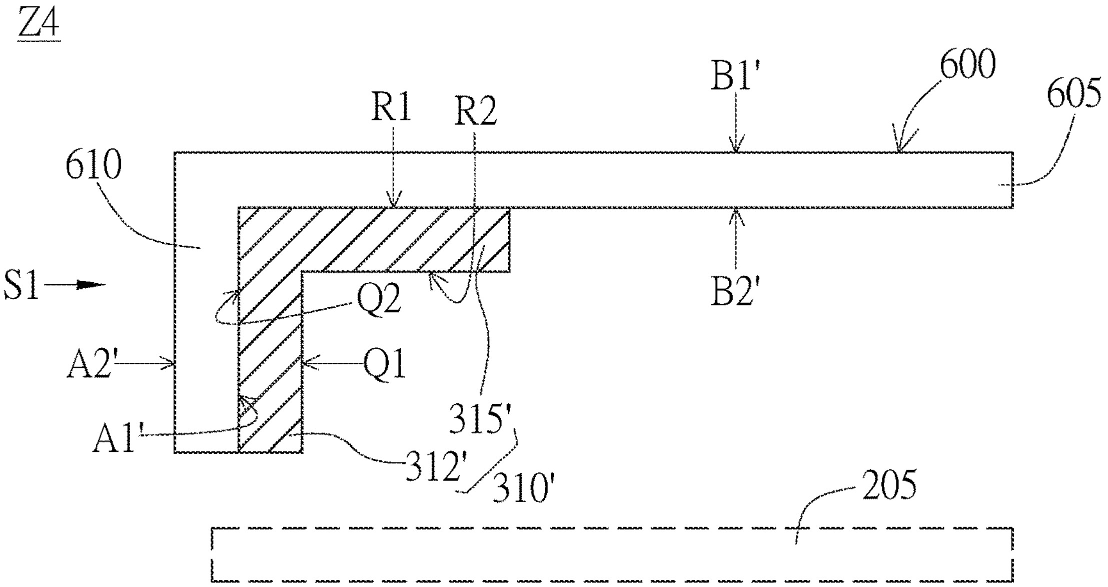

Next, as shown in FIGS. 16C and 16D, according to the variants Z3 and Z4, the front frame 600 may, along the first side S1, have the side frame portion 610 standing upright relative to the base plate 205, and the top frame portion 605 protruding from one end of the side frame portion 610 opposite to the base plate 205 to face the base plate 205. Furthermore, the first auxiliary fixing member 310' has the first auxiliary wall body 312' and a top plate 315' that is connected to the first auxiliary wall body 312' and protrudes relative to the first auxiliary wall body 312' to face the base plate 205.

In the variant Z3 shown in FIG. 16C, the inner wall surface Q1 of the first auxiliary wall body 312' of the first auxiliary fixing member 310' and the outer wall surface A2' of the side frame portion 610 are attached to each other. In addition, the wall surface of the top plate 315' of the first auxiliary fixing member 310' (that is, a back surface R2) is attached to the wall surface of the top frame portion 605 (that is, a front surface B1'). Therefore, according to this embodiment, by attaching the first auxiliary wall body 312' in a wall shape to the side frame portion 610, and by further supporting the top frame portion 605 with the top plate 315', the curvature change of the front frame 600 can be further stabilized and maintained.

Furthermore, in the variant Z4 shown in FIG. 16D, the outer wall surface Q2 of the first auxiliary wall body 312' of the first auxiliary fixing member 310' and the inner wall surface A1' of the side frame portion 610 are attached to each other. In addition, the wall surface of the top plate 315' of the first auxiliary fixing member 310' (that is, a front surface R1) is attached to the wall surface of the top frame portion 605 (that is, a bottom surface B2'). That is, the first auxiliary fixing member 310' is provided to abut against the wall surface of the front frame 600 facing the base plate 205. Therefore, according to this embodiment, by attaching the first auxiliary wall body 312' in a wall shape to the side frame portion 610, and by making the side frame portion 610 and the top frame portion 605 abut against the first auxiliary wall body 312' and the top plate 315' of the first auxiliary fixing member 310' in the direction of the inner side of the front frame 600 prone to unexpected deformation, the curvature change of the front frame 600 can be further enhanced, stabilized and maintained.

As mentioned above, if space and cost allow, the above variants can also be combined to achieve more stable curvature adjustment.

Figure 16E:
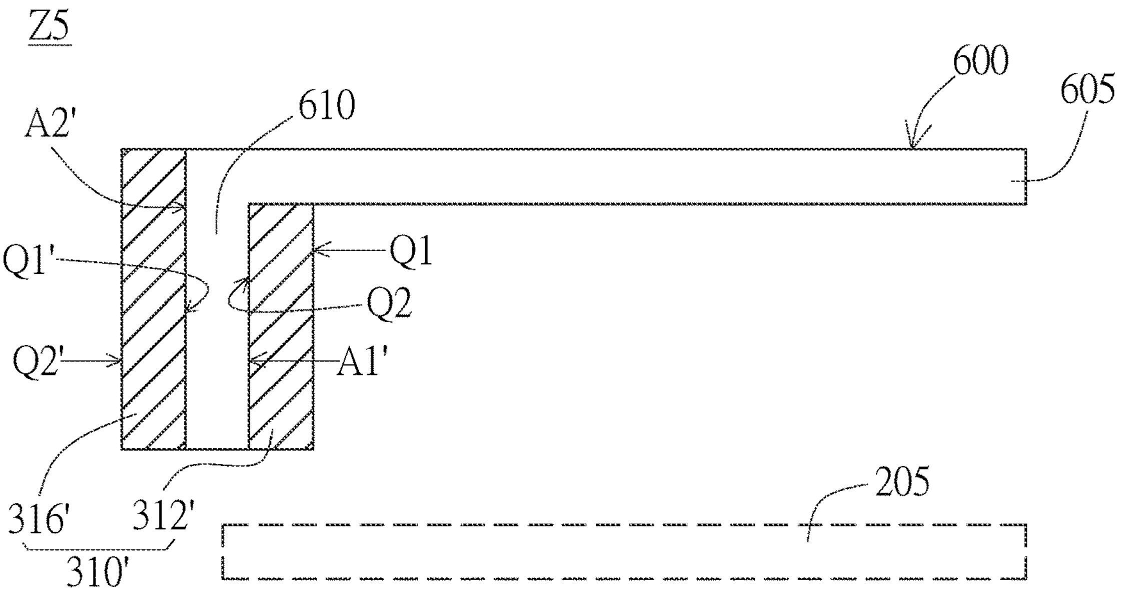

By way of examples, as shown in FIG. 16E, according to the variant Z5, it is different from the variant Z2 in that the first auxiliary fixing member 310' further has a first auxiliary opposite wall body 316' separated from the first auxiliary wall body 312'. The outer wall surface Q2 of the first auxiliary wall body 312' and the inner wall surface Q1' of the first auxiliary opposite wall body 316' can be attached to the inner wall surface A1' and the outer wall surface A2' of the side frame portion 610 on two opposite sides, respectively, so that the outer wall surface Q2' of the first auxiliary opposite wall body 316' faces outward. Therefore, according to this embodiment, the curvature adjustment of the front frame 600 can be further stabilized in a simplified structure.

Figure 16F:
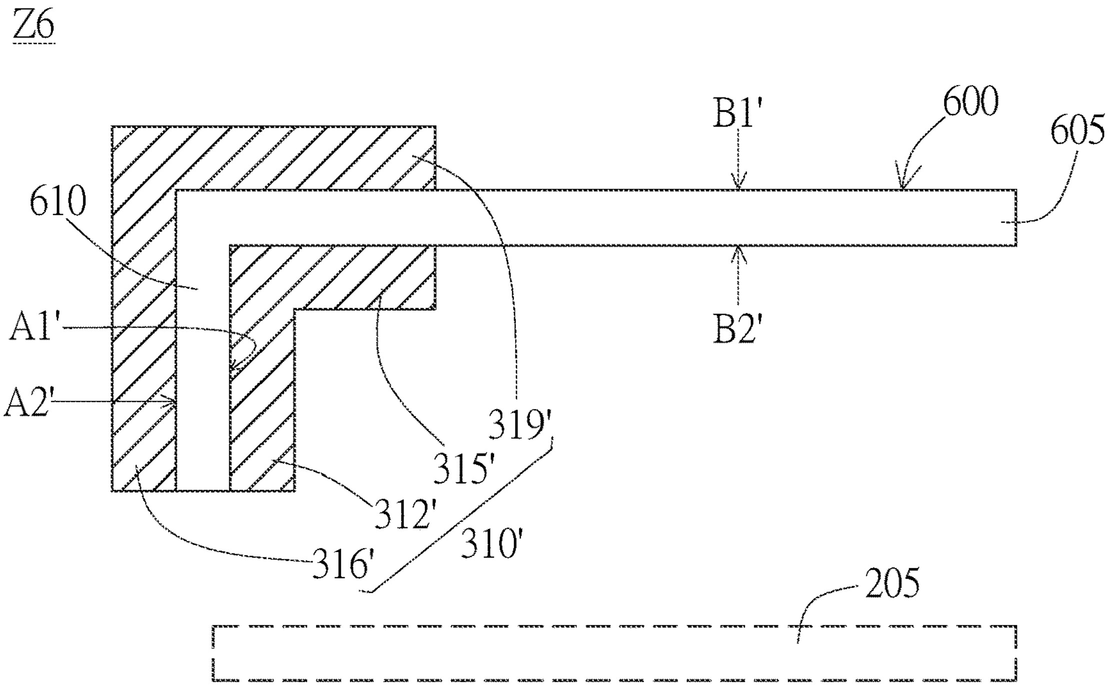

In addition, as shown in FIG. 16F, according to the variant Z6, it is different from the variant Z4 in that the first auxiliary fixing member 310' further has a first auxiliary opposite wall body 316' separated from the first auxiliary wall body 312', and a top plate 319' connected to the first auxiliary opposite wall body 316'. In view of the foregoing, the first auxiliary wall body 312' and the top plate 315' of the first auxiliary fixing member 310' are provided to abut against the wall surface of the front frame 600 facing the base plate 205. On the contrary, the first auxiliary opposite wall body 316' and the top plate 319' of the first auxiliary fixing member 310' are provided to abut against the wall surface of the front frame 600 back-facing the base plate 205. Therefore, according to this embodiment, the curvature adjustment of the front frame 600 can be further enhanced and stabilized with a structure of the top plates 315' and 319'.

Figure 16G:
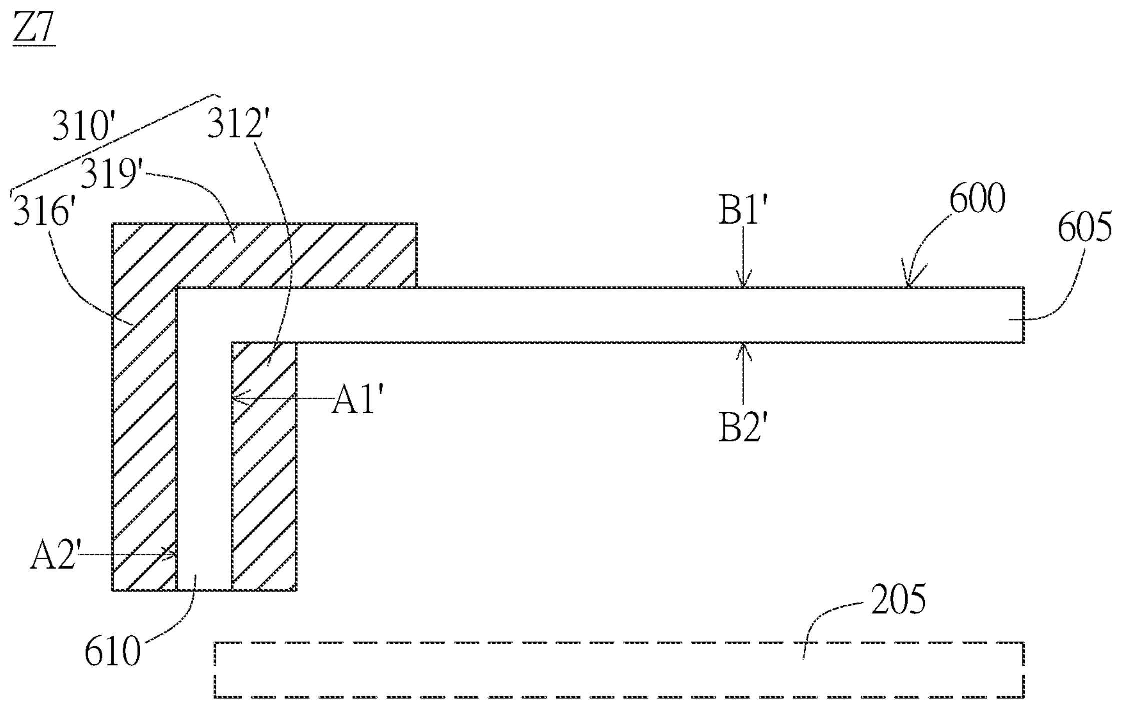

Moreover, as shown in FIG. 16G, according to the variant Z7, it is different from the variant Z6 in that the top plate 315' connected to the first auxiliary wall body 312' and provided along the bottom surface B2' of the top frame portion 605 in a protruding manner is not provided. Therefore, according to this embodiment, the setting space defined by the interior of the front frame 600 can be increased as needed in a case that the curvature adjustment of the front frame 600 is stabilized.

Figure 16H:
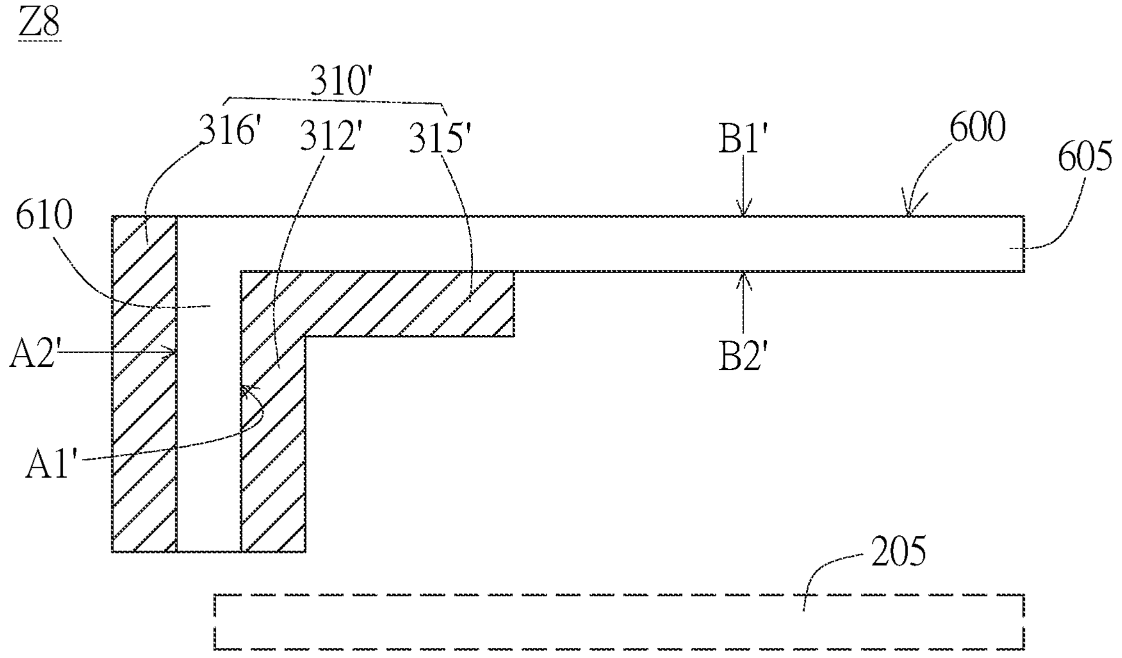

On the contrary, as shown in FIG. 16H, according to the variant Z8, it is different from the variant Z6 in that the top plate 319' connected to the first auxiliary opposite wall body 316' and provided along the front surface B1' of the top frame portion 605 in a protruding manner is not provided. Therefore, according to this embodiment, an increase in thickness on the front frame 600 can be reduced or avoided as needed in a case where the curvature adjustment of the front frame 600 is stabilized, and it can be avoided that the top plate 319' is observed from the front frame 600 when in use, thereby improving or simplifying the appearance.

In summary, according to the display panel in the various embodiments of the present invention, the predetermined curvatures of other flexible components can be adjusted correspondingly based on the predetermined curvature of the fixing member provided along the side. Therefore, the display panels of different predetermined curvatures can be implemented by applying the fixing members of different predetermined curvatures, without preparing each component with the predetermined curvature. Therefore, diversified non-planar display panels or curved display panels can be implemented by combining basic core components with different fixing members, such that preparation cost and pre-work are significantly reduced. Further, the curvature of the display panel that should be set can be designed and changed more flexibly for different setting environments and scenarios, thereby increasing the applicability and industrialization of the display panel.

The above are only some preferred embodiments of the present invention. It should be noted that the present invention can undergo various changes and modifications without departing from the spirit and principles of the present invention. Those skilled with general knowledge in the art should understand that the present invention is defined by the scope of the attached claims, and that, in accordance with the intent of the present invention, various possible substitutions, combinations, modifications, and adaptations are not beyond the scope of the present invention defined by the scope of the attached claims.

REFERENCE NUMERALS

10, 20, 30, 40, 50: display panel
200: backplane
205: base plate
210: first sidewall portion
220: second sidewall portion
310: first fixing member
310': first auxiliary fixing member
312: first wall body
312': first auxiliary wall body
314: cover plate
315: support portion
315': top plate
316: first opposite wall body
316': first auxiliary opposite wall body
319: support portion
319': top plate
320: second fixing member
322: second wall body
400: framework
500: display module
600: front frame
605: top frame portion
610: side frame portion
A1: inner wall surface
A2: outer wall surface
A3: top surface
A1': inner wall surface
A2': outer wall surface
B1: front surface
B2: back surface
B1': front surface
B2': bottom surface
C1 、C1: first predetermined curvatures
C2: second predetermined curvature
D1: first direction
D2: second direction
F1: inner wall surface
F2: outer wall surface
F1': inner wall surface
F2': outer wall surface
H 、H' 、H": grooves
K: deformation
M: chamber
N: deformation
P: periphery
Q1: inner wall surface
Q2: outer wall surface
Q1': inner wall surface
Q2': outer wall surface
R1: front surface
R2: back surface
S1: first side
S2: second side
S3: third side
S4: fourth side
T1 、T2 、T3 、T4 、T5 、T6 、T7 、T8 、T9 、T10: variant
Z1 、Z2 、Z3 、Z4 、Z5 、Z6 、Z7 、Z8: variant

What is claimed is:

1. A display panel, comprising:

a backplane, having flexibility, and having a base plate, the base plate having a first side;

a first fixing member, extending corresponding to the first side and having a first predetermined curvature, the first fixing member having at least a first wall body, the first wall body standing upright relative to the base plate, and being relatively fixed to the backplane, so that the curvature of the backplane is adjusted corresponding to the first fixing member;

a front frame, having flexibility, and provided in a manner of extending corresponding to the periphery of the backplane and being relatively fixed to the backplane, so that the curvature of the front frame is relatively adapted to that of the backplane; and a display module, provided between the backplane and the front frame.

2. The display panel according to claim 1, further comprising a framework, having flexibility, being provided between the backplane and the front frame in a manner of extending corresponding to the periphery of the backplane, and being relatively fixed to the backplane, so that the curvature of the framework is relatively adapted to that of the backplane, wherein the display module is provided between the front frame and the framework.

3. The display panel according to claim 1, wherein the backplane further has a first sidewall portion, and the first sidewall portion protrudes from the base plate on the first side and stands upright;

wherein the wall surface of the first wall body of the first fixing member and the wall surface of the first sidewall portion are attached to each other.

4. The display panel according to claim 3, wherein the first sidewall portion and the base plate define a chamber, and wherein the first wall body of the first fixing member is provided in the chamber.

5. The display panel according to claim 3, wherein the first fixing member further has a cover plate connected to the first wall body, and a first opposite wall body connected to the cover plate, and the first wall body and the first opposite wall body protrude oppositely from both sides of the cover plate and stand upright, and wherein the cover plate is covered and stacked on the top surface of the first sidewall portion, and the wall surface of the first wall body and the wall surface of the first opposite wall body are attached to the wall surfaces of two opposite sides of the first sidewall portion, respectively.

6. The display panel according to claim 1, wherein the first fixing member further has a support portion connected to the first wall body, and the first wall body protrudes relative to the support portion and stands upright, and wherein the support portion is provided along the first side and is attached to at least part of a bottom surface of the base plate back-facing the display module.

7. The display panel according to claim 4, wherein the first fixing member further has a support portion connected to the first wall body, and the first wall body protrudes relative to the support portion and stands upright, wherein the first fixing member is provided in the chamber, and the support portion is provided along the first side and is attached to at least part of a front surface of the base plate facing the display module.

8. The display panel according to claim 1, wherein the backplane further has a first sidewall portion, and the first sidewall portion protrudes from the base plate on the first side and stands upright;

wherein the first fixing member further has a support portion connected to the first wall body, and a first opposite wall body separated from the first wall body and the support portion, and the first wall body protrudes relative to the support portion and stands upright, and wherein the support portion is provided along the first side and is attached to at least part of the base plate, and the wall surface of the first wall body and the wall surface of the first opposite wall body are attached to the wall surfaces of two opposite sides of the first sidewall portion, respectively.

9. The display panel according to claim 1, wherein the first predetermined curvature of the first fixing member varies along the first side.

10. The display panel according to claim 1, wherein the display panel comprises a plurality of the first fixing members provided sequentially along the first side, and wherein the plurality of first fixing members have the same or different first predetermined curvatures.

11. The display panel according to claim 1, wherein the base plate has a second side that is opposite but not connected to the first side, and the display panel further comprises a second fixing member, the second fixing member extending corresponding to the second side and having a second predetermined curvature, and wherein the second fixing member has at least one second wall body, the second wall body standing upright relative to the base plate, and being relatively fixed to the backplane, so that the curvature of the backplane is adjusted relative to the second fixing member.

12. The display panel according to claim 1, wherein the backplane further has a first sidewall portion, and the first sidewall portion protrudes from the base plate on the first side and stands upright, and the first sidewall portion has a plurality of grooves, so that a top surface of the first sidewall portion opposite to the base plate extends discontinuously.

13. The display panel according to claim 1, wherein the front frame has a top frame portion facing the base plate, a side frame portion standing upright relative to the base plate, or a combination thereof, and the top frame portion, the side frame portion, or the combination thereof has a plurality of grooves along the first side, so that the front frame extends discontinuously along the edge of the first side.

14. The display panel according to claim 1, further comprising:

a first auxiliary fixing member, extending corresponding to the first side and having the first predetermined curvature, the first auxiliary fixing member having at least a first auxiliary wall body, the first auxiliary wall body standing upright relative to the base plate, and being relatively fixed to the front frame, so that the curvature of the front frame is adjusted corresponding to the first auxiliary fixing member.

15. The display panel according to claim 14, wherein the front frame has a side frame portion standing upright relative to the base plate along the first side, and wherein the wall surface of the first auxiliary wall body of the first auxiliary fixing member and the wall surface of the side frame portion are attached to each other.

16. The display panel according to claim 15, wherein the first auxiliary wall body is attached to the wall surface of one side of the side frame portion facing the center of the base plate.

17. The display panel according to claim 14, wherein the front frame has a side frame portion standing upright relative to the base plate, and a top frame portion provided in a manner of protruding from the side of the side frame portion opposite to the base plate to face the base plate, wherein the first auxiliary fixing member further has a top plate connected to the first auxiliary wall body and protrudes relative to the first auxiliary wall body to face the base plate, and wherein the wall surface of the top plate is attached to the wall surface of the top frame portion, and the wall surface of the first auxiliary wall body is attached to the wall surface of the side frame portion.

18. The display panel according to claim 17, wherein the first auxiliary fixing member is provided to abut against the wall surface of the front frame facing the base plate.

19. The display panel according to claim 14, wherein the front frame has a side frame portion standing upright relative to the base plate, and the first auxiliary fixing member further has a first auxiliary opposite wall body separated from the first auxiliary wall body, and wherein the wall surface of the first auxiliary wall body and the wall surface of the first auxiliary opposite wall body are attached to the wall surfaces on two opposite sides of the side frame portion, respectively.

* * * * *